United States Patent
Lablans

(10) Patent No.: US 8,355,042 B2
(45) Date of Patent: Jan. 15, 2013

(54) CONTROLLER IN A CAMERA FOR CREATING A PANORAMIC IMAGE

(75) Inventor: Peter Lablans, Morris Township, NJ (US)

(73) Assignee: Spatial Cam LLC, Morristown, NJ (US)

( * ) Notice: Subject to any disclaimer, the term of this patent is extended or adjusted under 35 U.S.C. 154(b) by 702 days.

(21) Appl. No.: 12/538,401

(22) Filed: Aug. 10, 2009

(65) Prior Publication Data

US 2010/0097443 A1    Apr. 22, 2010

Related U.S. Application Data

(60) Provisional application No. 61/106,025, filed on Oct. 16, 2008, provisional application No. 61/106,768, filed on Oct. 20, 2008.

(51) Int. Cl.
*H04N 7/00* (2006.01)

(52) U.S. Cl. ........ 348/36; 348/39; 348/46; 348/E13.007

(58) Field of Classification Search .................... 348/36, 348/39, 46, E13.007
See application file for complete search history.

(56) References Cited

U.S. PATENT DOCUMENTS

| | | | |
|---|---|---|---|
| 4,782,402 A | 11/1988 | Kanamaru | |
| 5,257,324 A | 10/1993 | Bumgardner | |
| 5,343,243 A | 8/1994 | Maeda | |
| 5,568,192 A | 10/1996 | Hannah | |
| 5,646,679 A | 7/1997 | Yano et al. | |
| 5,680,649 A | 10/1997 | Akimoto et al. | |
| 5,960,108 A * | 9/1999 | Xiong | 382/154 |
| 6,157,747 A * | 12/2000 | Szeliski et al. | 382/284 |
| 6,178,144 B1 | 1/2001 | Huiber | |
| 6,282,320 B1 | 8/2001 | Hasegawa et al. | |
| 6,284,085 B1 | 9/2001 | Gwo | |
| 6,323,858 B1 | 11/2001 | Gilbert et al. | |
| 6,574,417 B1 | 6/2003 | Lin et al. | |
| 6,625,305 B1 | 9/2003 | Keren | |
| 6,669,346 B2 | 12/2003 | Metcalf | |
| 6,677,982 B1 * | 1/2004 | Chen et al. | 348/36 |
| 6,727,941 B1 | 4/2004 | Coleman | |
| 6,801,674 B1 | 10/2004 | Turney | |
| 6,885,374 B2 | 4/2005 | Doyle et al. | |
| 6,885,392 B1 * | 4/2005 | Mancuso et al. | 348/36 |
| 6,900,837 B2 | 5/2005 | Murumatsu et al. | |
| 6,961,055 B2 | 11/2005 | Doak et al. | |
| 6,972,796 B2 | 12/2005 | Katta et al. | |
| 6,989,862 B2 | 1/2006 | Baharav et al. | |
| 7,020,888 B2 | 3/2006 | Reynolds et al. | |

(Continued)

OTHER PUBLICATIONS

Szeliski, Richard "Image Alignment and Stitching: A Tutorial Preliminary Draft", *Technical Report MSR-TR-2004-92, Microsoft online*, (Sep. 27, 2004), 59 pp.

(Continued)

*Primary Examiner* — Alina N. Boutah

(57) ABSTRACT

Methods and apparatus to create and display panoramic images on a mobile device are disclosed. Such a mobile device can be a mobile phone. Apparatus is provided to control the position of a lens in relation to a reference lens. Methods and apparatus are provided to generate multiple images that are combined into a panoramic image. A panoramic image may be a static image. It may also be a video image. A controller provides correct camera settings for different conditions. An image processor creates a panoramic image from the correct settings provided by the controller. A panoramic camera is applied in a computer gaming system.

20 Claims, 23 Drawing Sheets

U.S. PATENT DOCUMENTS

| | | | |
|---|---|---|---|
| 7,085,484 B2 | 8/2006 | Hara | |
| 7,102,686 B1 | 9/2006 | Orimoto et al. | |
| 7,123,745 B1 | 10/2006 | Lee | |
| 7,126,897 B2 | 10/2006 | Takeuchi et al. | |
| 7,136,333 B2 | 11/2006 | Wong et al. | |
| 7,149,178 B2 | 12/2006 | Wong et al. | |
| 7,149,367 B2* | 12/2006 | Cutler | 382/284 |
| 7,218,144 B2 | 5/2007 | Lablans | |
| 7,227,893 B1 | 6/2007 | Srinivasa et al. | |
| 7,259,792 B2 | 8/2007 | Terada | |
| 7,280,745 B2 | 10/2007 | Mollie et al. | |
| 7,345,934 B2 | 3/2008 | Guterman et al. | |
| 7,355,444 B2 | 4/2008 | Lablans | |
| 7,365,787 B2 | 4/2008 | Nobels | |
| 7,365,789 B2 | 4/2008 | Ogino | |
| 7,397,690 B2 | 7/2008 | Lablans | |
| 7,424,175 B2 | 9/2008 | Lipton et al. | |
| 7,460,730 B2 | 12/2008 | Pal et al. | |
| 2002/0154812 A1* | 10/2002 | Chen et al. | 382/154 |
| 2003/0179923 A1* | 9/2003 | Xiong et al. | 382/154 |
| 2004/0257436 A1 | 12/2004 | Koyanagi et al. | |
| 2005/0078108 A1* | 4/2005 | Swift et al. | 345/419 |
| 2005/0122400 A1* | 6/2005 | Kochi et al. | 348/207.99 |
| 2006/0017935 A1* | 1/2006 | Philipps et al. | 356/602 |
| 2006/0114309 A1* | 6/2006 | Bush | 347/116 |
| 2006/0164883 A1 | 7/2006 | Lablans | |
| 2006/0197867 A1* | 9/2006 | Johnson et al. | 348/373 |
| 2006/0215031 A1* | 9/2006 | Krahnstoever et al. | 348/187 |
| 2007/0031062 A1* | 2/2007 | Pal et al. | 382/284 |
| 2007/0035516 A1 | 2/2007 | Voto et al. | |
| 2007/0041656 A1* | 2/2007 | Clarke et al. | 382/274 |
| 2007/0165942 A1* | 7/2007 | Jin et al. | 382/154 |
| 2007/0248260 A1* | 10/2007 | Pockett | 382/154 |
| 2007/0279494 A1* | 12/2007 | Aman et al. | 348/169 |
| 2007/0285554 A1* | 12/2007 | Givon | 348/340 |
| 2008/0002023 A1* | 1/2008 | Cutler | 348/36 |
| 2008/0024594 A1* | 1/2008 | Ritchey | 348/36 |
| 2008/0024596 A1 | 1/2008 | Li et al. | |
| 2008/0024614 A1 | 1/2008 | Li et al. | |
| 2008/0049098 A1* | 2/2008 | Jones | 348/36 |
| 2008/0074500 A1* | 3/2008 | Chen et al. | 348/207.1 |
| 2008/0106634 A1* | 5/2008 | Masuda | 348/362 |
| 2008/0111583 A1 | 5/2008 | Lablans | |
| 2008/0180987 A1 | 7/2008 | Lablans | |
| 2008/0218587 A1* | 9/2008 | Glatt | 348/39 |
| 2009/0160936 A1* | 6/2009 | McCormack | 348/143 |
| 2010/0111489 A1* | 5/2010 | Presler | 386/52 |
| 2012/0057053 A1* | 3/2012 | Mallon et al. | 348/241 |

OTHER PUBLICATIONS

Zitova, Barbara et al., "Image Registration Methods: A Survey", *Image and Vision Computing 21*, (2003), 977-1000 pp.

PCT International Search Report and Written Opinion in PCT/US2009/043075, (Jul. 6, 2009), 12 pgs.

PCT International Search Report & Written Opinion in PCT/US2009/043410, (Jul. 7, 2009), 12 pgs.

* cited by examiner

CONTROLLER IN A CAMERA FOR CREATING A PANORAMIC IMAGE

STATEMENT OF RELATED CASES

This application claims the benefit of U.S. Provisional Patent Application Ser. No. 61/106,025, filed Oct. 16, 2008, and of U.S. Provisional Patent Application Ser. No. 61/106,768, filed Oct. 20, 2008, which are both incorporated herein by reference in their entirety.

BACKGROUND OF THE INVENTION

The present invention relates to digital image devices. More specifically, it relates to a controller device in a digital camera, the camera being enabled by the controller to record at least two images and generate a single, optimally registered panoramic image from those at least two images.

Digital cameras are increasingly popular. The same applies to camera phones. The digital images taken by these devices use a digital sensor and a memory which can store data generated by the sensor. Data may represent a still image. Data may also represent a video image. Images may be viewed on the device. Images may also be transferred to an external device, either for viewing, for storage or for further processing.

Panoramic images are also very popular and have been created from the time of photographic film to the present day of digital imaging. A whole range of tools exists to combine two or more images from a scene into a single, combined, hopefully seamless panoramic image. This process of combining is called registering, stitching or mosaicing. An advantage of a panoramic image is to provide a view of a scene that is usually beyond what is usually possible with a common camera and having no or very little distortion.

The process of picture taking for creating a panoramic image is a process that has many different technologies, apparatus and methods. Very common is the method of taking a first picture with a single lens camera, followed by taking at least a second picture at a later time, and followed by stitching the pictures together. This method is not very user friendly or requires complex cameras or complex camera settings. Furthermore, this method may be troublesome for creating video images.

Cameras with multiple lenses are also known. These cameras should be easier to use. However, current implementations still require users to provide fairly involved manual settings.

Accordingly, novel and improved methods and apparatus are required for creating, recording, storing and playing of panoramic images.

SUMMARY OF THE INVENTION

One aspect of the present invention presents novel methods and systems for recording, processing storing and concurrent displaying of a plurality of images which may be video programs into a panoramic image.

In accordance with an aspect of the present invention, an apparatus is provided for generating a combined image from at least a first and a second image of a scene with a camera having at least a first lens being associated with a first image sensor for generating the first image and a second lens being associated with a second image sensor for generating the second image, comprising a memory, enabled to store and provide data related to a first setting of the second lens, the first setting of the second lens being associated with data related to a first setting of the first lens, a controller, applying data related to the first setting of the first lens for retrieving from the memory data related to the first setting of the second lens, the controller using the retrieved data for driving a mechanism related to the second lens to place the second lens in the first setting of the second lens.

In accordance with a further aspect of the present invention, an apparatus is provided, further comprising the memory having stored data defining a first area of the second image sensor which is associated with the first setting of the first lens, and the memory having stored data defining a first area of the first image sensor which is associated with the first setting of the first lens.

In accordance with yet a further aspect of the present invention, an apparatus is provided, further comprising a display which displays the combined image which is formed by merging of image data from the first area of the first image sensor and image data of the first area of the second image sensor.

In accordance with yet a further aspect of the present invention, an apparatus is provided, further comprising, the first area of the first image sensor being determined by a merge line; and a display which displays the combined image which is formed by merging of image data from the first area of the first image sensor and image data of the first area of the second image sensor along the merge line.

In accordance with yet a further aspect of the present invention, an apparatus is provided, wherein the data defining a first area of the second image sensor determines what image data stored in an image memory is read for further processing.

In accordance with yet a further aspect of the present invention, an apparatus is provided, wherein a setting of the second lens is one or more of the group consisting of focus, diaphragm, shutter speed, zoom and position related to the first lens.

In accordance with yet a further aspect of the present invention, an apparatus is provided, further comprising at least a third lens being associated with a third image sensor.

In accordance with yet a further aspect of the present invention, an apparatus is provided, wherein the first lens and second lens are part of a mobile phone.

In accordance with yet a further aspect of the present invention, an apparatus is provided, wherein the image is a video image.

In accordance with yet a further aspect of the present invention, an apparatus is provided, wherein the camera is part of a computer gaming system.

In accordance with another aspect of the present invention, a method is provided for creating a stitched panoramic image from at least a first and a second image of a scene with a camera having at least a first lens being associated with a first image sensor for generating the first image and a second lens being associated with a second image sensor for generating the second image, comprising setting the first lens in a first focus setting on the scene, associating a first focus setting of the second lens with the first focus setting of the first lens, storing data related to the first focus setting of the second lens in a memory, determining an alignment parameter related to an alignment of an area of the first image sensor with an area of the second image sensor, associating the alignment parameter with the first focus setting of the first lens, and storing the alignment parameter in the memory.

In accordance with yet another aspect of the present invention, a method is provided, further comprising placing the first lens in the first focus setting, retrieving from the memory data of a focus setting of the second lens by applying the first setting of the first lens, and driving a mechanism of the second lens under control of a controller to place the second lens in a position using the retrieved data of the focus setting of the second lens.

In accordance with yet another aspect of the present invention, a method is provided, further comprising retrieving from the memory the alignment parameter related to the focus setting of the first lens, and generating the stitched panoramic image by processing image data generated by the first image sensor and the second image sensor in accordance with the alignment parameter related to the focus setting of the first lens.

In accordance with yet another aspect of the present invention, a method is provided, wherein the camera is part of a mobile computing device.

In accordance with a further aspect of the present invention, a controller is provided for generating a stitched panoramic image from at least two images of a scene with a camera having at least a first and a second lens and a first and a second image sensor, comprising a memory, enabled to store and retrieve data related to a setting of a first lens, a processor, enabled to retrieve data from the memory and the processor executing instructions for performing the steps of retrieving from the memory data determining a first setting of the second lens based on a first setting of the first lens, and instructing a mechanism related to the second lens to place the second lens in a setting determined by the retrieved data related to the first setting of the first lens.

In accordance with yet a further aspect of the present invention, a controller is provided, further comprising instructions to perform the steps of retrieving from the memory data defining an area of the first image sensor and data defining an area of the second image sensor related to the first setting of the first lens, and instructing an image processor to process image data of the area of the first image sensor and of the area of the second image sensor to create the stitched panoramic image.

In accordance with yet a further aspect of the present invention, a controller is provided, wherein a setting of a lens of the camera includes at least one of a group consisting of focus, aperture, exposure time, position and zoom.

In accordance with yet a further aspect of the present invention, a controller is provided, wherein the camera comprises a display for displaying the stitched panoramic image.

In accordance with yet a further aspect of the present invention, a controller is provided, wherein the camera is part of a gaming system.

In accordance with yet a further aspect of the present invention, a controller is provided, wherein the gaming system segments the stitched panoramic image from a background.

In accordance with yet a further aspect of the present invention, a controller is provided, wherein the image processor is enabled to blend image data based on the alignment parameter.

In accordance with an aspect of the present invention a camera is provided, comprising a first and a second imaging unit, each unit including a lens and a sensor, a portable body, the sensors of the first and second imaging unit being rotationally aligned in the portable body with a misalignment angle that is determined during a calibration, and a controller for applying data generated during the calibration determining an active sensor area of the sensor of the first imaging unit and an active area of the sensor of the second imaging unit to generate a registered panoramic image.

In accordance with a further aspect of the present invention, the provided camera further comprises a display for displaying the registered panoramic image.

In accordance with yet a further aspect of the present invention the camera is provided, wherein a pixel density of the sensor in the first unit is greater than the pixel density of the display.

In accordance with yet a further aspect of the present invention the camera is provided, wherein the registered panoramic image is a video image.

In accordance with yet a further aspect of the present invention the camera is provided, wherein the misalignment angle is negligible and wherein image data associated with pixels on a horizontal line of the sensor of the first unit is combined with image data associated with pixels on a horizontal line of the sensor of the second unit to generate a horizontal line of pixels in the registered panoramic image.

In accordance with yet a further aspect of the present invention the camera is provided, wherein the misalignment angle is about or smaller than 5 degrees.

In accordance with yet a further aspect of the present invention the camera is provided, wherein the misalignment angle is about or smaller than 1 degree.

In accordance with yet a further aspect of the present invention the camera is provided, wherein the misalignment angle is about or smaller than 0.5 degree.

In accordance with yet a further aspect of the present invention the camera is provided, wherein the misalignment angle is about or smaller than 1 arcmin.

In accordance with yet a further aspect of the present invention the camera is provided, wherein the misalignment angle is applied to determine a scanline angle for the sensor of the second imaging unit.

In accordance with yet a further aspect of the present invention the camera is provided, wherein the misalignment error is applied to generate an address transformation to store image data of the active sensor area of the sensor of the second imaging unit in a rectangular addressing scheme.

In accordance with yet a further aspect of the present invention the camera is provided, wherein the camera is comprised in a mobile computing device.

In accordance with yet a further aspect of the present invention the camera is provided, wherein the camera is comprised in a mobile phone.

In accordance with yet a further aspect of the present invention the camera is provided, further comprising at least a third unit including a lens and a sensor.

In accordance with yet a further aspect of the present invention the camera is provided, wherein the lens of the first unit has a fixed focal length.

In accordance with yet a further aspect of the present invention the camera is provided, wherein the lens of the first unit has a variable focal length.

In accordance with yet a further aspect of the present invention the camera is provided, wherein the lens of the first unit is a zoom lens.

In accordance with yet a further aspect of the present invention the camera is provided, further comprising a mechanism that can reduce the misalignment angle to negligible.

In accordance with another aspect of the present invention a camera is provided, comprising a first and a second imaging unit, each imaging unit including a lens and a sensor; and a controller for applying data generated during a calibration determining an active sensor area of the sensor of the first imaging unit and an active area of the sensor of the second imaging unit to generate a registered panoramic image during operation of the camera.

In accordance with yet another aspect of the present invention the camera is provided, wherein the camera is part of a mobile phone.

DESCRIPTION OF A PREFERRED EMBODIMENT

In a first embodiment of the present invention, a camera is a digital camera with at least 2 lenses and each lens being associated with an image sensor, which may for instance be a CCD image sensor. It may also be a CMOS image sensor, or any other image sensor that can record and provide a digital image. An image sensor has individual pixel element sensors which generate electrical signals. The electrical signals can form an image. The image can be stored in a memory. An image stored in a memory has individual pixels, which may be processed by an image processor. An image recorded by a digital camera may be displayed on a display in the camera body. An image may also be provided as a signal to the external world, for further processing, storage or display. An image may be a single still image. An image may also be a series of images or frames, forming a video image when encoded and later decoded and displayed in appropriate form.

Figure 1:
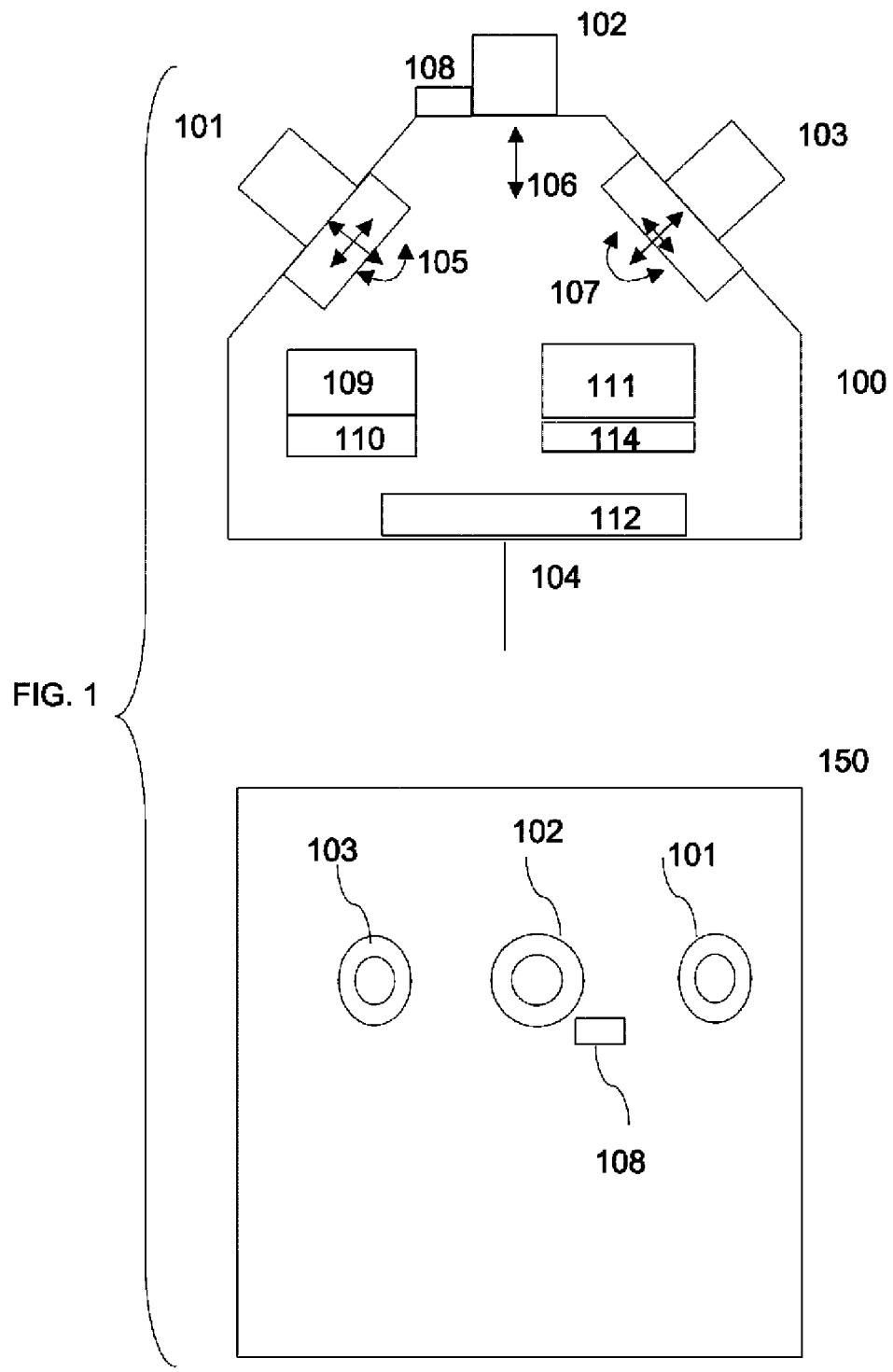
FIG. 1 is a diagram of a camera for panoramic images in accordance with an aspect of the present invention.

In one embodiment, to create a panoramic image a camera has at least two lenses, each lens being associated with an image sensor. This is shown in FIG. 1 in view 100 and 150. As an illustrative example a camera 100 has three lenses 101, 102 and 103. Each lens is associated with an image sensor. Accordingly, 101, 102 and 103 may also be interpreted as a sensor unit, which is an embodiment having a lens and an image sensor, the image sensor being able to provide image data or image signals to an image processor 111, which may store image data, which may have been processed, in a memory 114. The image generated by 111 may be displayed on a display 112. The image may also be provided on a camera output 104. In a further embodiment, image data as generated through a lens by a sensor may be stored in an individual memory, to be processed in a later stage.

The panoramic digital camera of FIG. 1 has, as an illustrative example, one central sensor unit with lens 102. Associated with this sensor unit is an autofocus sensor system 108. Autofocus systems for cameras are well known. The autofocus sensor system 108 senses the distance to an object that is recorded by sensor unit 102. It provides a signal to a motor or mechanism 106 that puts the lens of 102 in the correct focus position for the measured distance. In accordance with an aspect of the present invention, data that represents a position of the lens of 102 is stored in memory 110 and is associated with a signal or data generated by a measurement conducted by autofocus unit 108.

FIG. 1 provides two diagram views of the illustrative embodiment of a panoramic camera. View 100 is a top view. View 150 is a front view. It is to be understood that FIG. 1 only provides an illustrative example. Other configurations, with different orientation of lenses, different number of lenses, different autofocus units (for instance "through the lens"), different aspect ratios of the camera bodies, different viewer options in addition or in place of a display, control buttons, external connectors, covers, positioning of displays, shape of the body, a multi-part body wherein one part has the display and another part has the lenses, etc are all contemplated.

The autofocus system including sensor and mechanism may also include a driver or controller. Such drivers and controllers are known and will be assumed to be present, even if they are not mentioned. Autofocus may be one aspect of a lens/sensor setting. Other aspects may include settings of diaphragm and/or shutter speed based on light conditions and on required depth of field. Sensors, mechanisms and controllers and or drivers for such mechanisms are known and are assumed herein, even if not specifically mentioned.

A panoramic camera may be a self-contained and portable apparatus, with as its main or even only function to create and display panoramic images. The panoramic camera may also be part of another device, such as a mobile computing device, a mobile phone, a PDA, a camera phone, or any other device that can accommodate a panoramic camera.

Sensor units, motors, controller, memories and image processor as disclosed herein are required to be connected in a proper way. For instance, a communication bus may run between all components, with each component having the appropriate hardware to have an interface to a bus. Direct connections are also possible. Connecting components such as a controller to one or more actuators and memories is known. Connections are not drawn in the diagrams to limit complexity of the diagrams. However, all proper connections are contemplated and should be assumed. Certainly, when herein a connection is mentioned or one component being affected directly by another component is pointed out then such a connection is assumed to exist.

In order to generate a panoramic image in this illustrative example, three sensor units are used, each unit having a lens and each lens having a motor to put the lens in the correct focus position. The lens of image sensing unit 101 has a motor 105 and image sensor unit 103 has a motor 107. The motors may be piezoelectric motors, also called piezo motors. The field of view of the lens of unit 101 has an overlap with the field of view with the lens of unit 102. The field-of-view of the lens of unit 103 has an overlap with the field of view of the lens of unit 102. At least for the focus area wherein the field of view of lenses of 101, 102 and 103 have an overlap, the image processor 111 may register the three images and stitch or combine the registered images to one panoramic image.

The motors 105 and 107 may have limited degree of freedom, for instance, only movement to focus a lens. It may also include a zoom mechanism for a lens. It may also provide a lens to move along the body of the camera. It may also allow a lens to be rotated relative to the center lens.

Image registration or stitching or mosaicing, creating an integrated image or almost perfectly integrated image from two or more images is known. Image registration may include several steps including:

a. finding a region of overlap between two images which may include identifying corresponding landmarks in two images;

b. aligning two images in an optimally matching position;

c. transformation of pixels of at least one image to align corresponding pixels in two images; and d. a blending or smoothing operation between two images that removes or diminishes between two aligned images a transition edge created by intensity differences of pixels in a connecting transition area.

The above steps for registering images are known and are for instance provided in Zitova, Barbara and Flusser, Jan: "Image registration methods: a survey" in Image and Vision Computing 21 (2003) pages 977-1000, which is incorporated herein by reference in its entirety. Another overview of registering techniques is provided in Image Alignment and Stitching: A Tutorial, by Richard Szeliski, Technical Report MSR-TR-2004-92, Microsoft, 2004, available on-line which is incorporated herein by reference.

The image processor may be enabled to perform several tasks related to creating a panoramic image. It may be enabled to find the exact points of overlap of images. It may be enabled to stitch images. It may be enabled to adjust the seam between two stitched images by for instance interpolation. It may also be able to adjust intensity of pixels in different images to make stitched images having a seamless transition.

It is possible that the three image lens/sensor units are not optimally positioned in relation to each other. For instance, the units may be shifted in a horizontal plane (pitch) in vertical direction. The sensor units may also be rotated (roll) related to each other. The sensor units may also show a horizontal shift (yaw) at different focus settings of the lenses. The image processor may be enabled to adjust images for these distortions and correct them to create one optimized panoramic image at a certain focus setting of the lens of unit 102.

At a certain nearby focus setting of the lenses it may no longer be possible to create a panoramic image of acceptable quality. For instance, parallax effects due to spacing of the lens units may be a cause. Also, the multiplier effect of lens and sensor systems (sizes) in digital cameras may limit the overlap in a sensor unit configuration as shown in FIG. 1. However, the configuration as shown in FIG. 1 is still able to create quality panoramic images in a digital camera, for instance in a camera phone. In a further embodiment of the present invention, the focus settings of the lenses of unit 101 and 103 by motors 105 and 107 are coordinated with the focus setting of the lens of unit 102 by motor 106 controlled by autofocus unit 108 by the controller 109.

In a further embodiment, motors or mechanisms moving the actual position of units 101 and 103 in relation to 103 may be used to achieve for instance a maximum usable sensor area of aligned sensors. These motors may be used to minimize image overlap if too much image overlap exists, or to create a minimum overlap of images if not enough overlap exists, or to create overlap in the right and/or desirable areas of the images generated by the sensors. All motor positions may be related to a reference lens position and focus and/or zoom factor setting of the reference lens. Motor or mechanism positions may be established and recorded in a memory in the camera during one or more calibration steps. A controller may drive motors or mechanism in a desired position based on data retrieved from the memory.

System Calibration

A coordination of sensor/lens units may be achieved in a calibration step. For instance, at one distance to an object the autofocus unit provides a signal and/or data that creates a first focus setting by motor 106 of the lens of 102, for instance, by using controller 109. This focus setting is stored in a memory 110. One may next focus the lens of unit 101 on the scene that contains the object on which the lens of 102 is now focused. One then determines the setting or instructions to motor 105 that will put the lens of unit 101 in the correct focus. Instructions related to this setting are associated with the setting of the lens of 102 and are stored in the memory 110. The same step is applied to the focus setting of the lens of unit 103 and the motor 107. Thus, when the sensor unit 108 creates a focus of the lens of 102, settings related to the lenses of 101 and 103 are retrieved from memory by a controller 111 from memory 110. The controller 111 then instructs the motors 105 and 107 to put the lenses of units 101 and 103 in the correct focus setting corresponding to a focus setting of the lens of unit 101, in order for the image processor 111 to create an optimal panoramic image from data provided by the image sensor units 101, 102 and 103.

One then applies the above steps for other object distances, thus creating a range of stored settings that coordinates the settings of the lenses of multiple sensor units. One may have a discrete number of distance settings stored in memory 110. One may provide an interpolation program that allows controller 109 to determine intermediate settings from settings that are stored in memory 110.

One may store positions and settings as actual positions or as positions to a reference setting. One may also code a setting into a code which may be stored and retrieved and which can be decoded using for instance a reference table. One may also establish a relationship between a setting of a reference lens and the setting of a related lens and have a processor determine that setting based on the setting of the reference lens.

In a further embodiment, one may combine focus setting with aperture settings and/or shutter speed for different hyperfocal distance settings. One may have different hyperfocal settings which may be selected by a user. If such a setting is selected for one lens, the controller 111 may apply these settings automatically to the other lenses by using settings or instructions retrieved from memory 110. A camera may automatically use the best hyperfocal setting, based on measured light intensity.

In general, camera users may prefer a point-and-click camera. This means that a user would like to apply as few manual settings as possible to create a picture or a video. The above configuration allows a user to point a lens at an object or scene and have a camera controller automatically configure lens settings for panoramic image creation.

In general, image processing may be processor intensive. This may be of somewhat less importance for creating still images. Creation of panoramic video that can be viewed almost at the same time that images are recorded requires real-time image processing. With less powerful processors it is not recommended to have software find for instance stitching areas, amount of yaw, pitch and roll, register images and so on. It would be helpful that the controller already knows what to do on what data, rather than having to search for it.

In a further embodiment of the present invention, instructions are provided by the controller 109 to image processor 111, based on settings of a lens, for instance on the setting of the center lens. These settings may be established during one or more calibration steps. For instance, during a calibration step in applying a specific distance one may apply predefined scenes, which may contain preset lines and marks.

Different configurations of a multi-lens/multi-sensor camera and manufacturing processes for such a multi-lens/multi-sensor camera are possible. One configuration may have motors to change lateral position and/or rotational position of a sensor/lens unit in relation to the body of the camera. This may lead to a camera with a broader range of creating possible panoramic images. It may also alleviate required processing power for an image processor. The use of such motors may also make the tolerances less restrictive of positioning sensor/lens units with regard to each other. This may make the manufacturing process of a camera cheaper, though it may require more expensive components, including motors or moving mechanisms.

In a further embodiment, one may position the sensor/lens units in exactly a preferred fixed position of each other, so that no adjustments are required. Such a construction may put severe requirements on the accuracy of manufacturing, thus making it relatively expensive.

In yet a further embodiment, one may allow some variation in rotation and translation in positioning the sensor/lens units, thus making the manufacturing process less restrictive and potentially cheaper. Any variation of positioning of sensors may be adjusted by the image processors, which may be assisted by calibration steps. In general, over time, signal processing by a processor may be cheaper than applying additional components such as motors, as cost of processing continues to go down.

Figure 2:
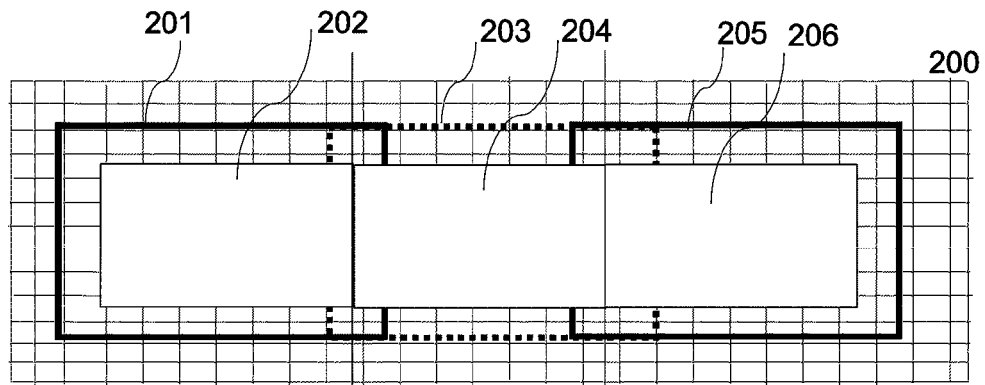
FIG. 2 illustrates a panoramic image created in accordance with an aspect of the present invention.
Figure 3:
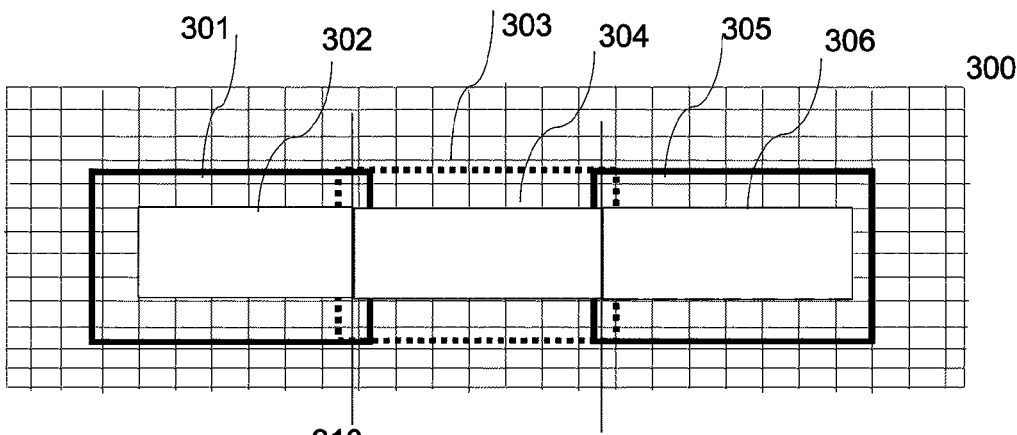
FIG. 3 illustrates a panoramic image created in accordance with another aspect of the present invention.

A first calibration step for a first illustrative embodiment of a set of 3 sensor units is described next. Herein, a set of three sensor/lens units is considered to be one unit. It is manufactured in such a way that three lenses and their sensors are aligned. The image created by each sensor has sufficient overlap so that at a maximum object distance and a defined minimum object distance a panoramic image can be created. A diagram is shown in FIGS. 2 and 3. In FIG. 2 a scene 200 provides a plurality of calibration points. One may relate images generated by the camera of FIG. 1 to images shown in FIGS. 2, 3 and 4. The image recorded by sensor/lens 102 in FIG. 1 is shown as window 203 in FIG. 2. This image will be used as the reference window in the examples. Other references are also possible. As one views an image in mirror in relation to the sensor/lens unit, the window 205 is related to sensor/lens 101. The window 201 is related to sensor/lens 103.

The sensor/lens units are aligned so that aligned and overlapping windows are created. In FIG. 2 the windows and thus the sensors have no rotation and/or translation in reference to each other. At a first calibration test it is determined that sensor areas 202, 204 and 206 will create an optimal panoramic image at that distance. The setting being associated with a focus setting of the center sensor/lens unit 102, and with this setting being associated focus settings of lenses of 101 and 103 corresponding to the setting of 102, relevant settings being stored in a memory 110 that can be accessed by a controller 109. It may be that at this setting lens distortion is avoided or minimized by selecting image windows 202, 204 and 206 of the sensor area. One may determine the coordinates of each image area in a sensor and store these coordinates for instance also in memory 110. When the present focus setting is applied the image processor 111 is instructed by the controller 109 to only process the image within retrieved coordinates of the image sensor which are associated with the setting in memory 110. One may provide a certain margin to allow the image processor to determine an optimal overlap with a very narrow margin. This limits the load on the processor and allows the image processor, based on predetermined settings to quickly create a stitched panoramic image.

When windows 201, 203 and 205 related to the image sensors are aligned it may suffice to establish a merge line 210 and 211 between the windows. In that case, one may instruct a processor to apply the image data of window/sensor 201 left of the merge line 210, use the image data of window/sensor 203 between merge lines 210 and 211 and the image data of window/sensor 205 to the right of merge line 211. One may save merge lines that are established during calibration as a setting. One may process the data in different ways to establish a panoramic image. One may save the complete images and process these later according to established merge lines. One may also only save the image data in accordance with the merge lines. One may for instance, save the data in accordance with the merge line in a memory, so that one can read the data as a registered image.

It is noted that one may provide the images for display on an external device, or for viewing on a display that is part of the camera. Currently, image sensors may have over 2 Megapixels. That means that a registered image may have well over 5 Megapixels. Displays in a camera are fairly small and may be able to handle much smaller number of pixels. In accordance with a further aspect of the present invention, the recorded images are downsampled for display on a display in a camera.

One may repeat the above calibration steps at a different distance. It may be that certain effects influence distortion and overlap. This is shown in FIG. 3 as sensor windows 301, 303 and 305. Again sensor 102 of FIG. 1 may be the reference sensor. The effective overlap sensor areas for creating a panoramic image at the second distance may be sensor areas 302, 304 and 306 which may be different from sensor areas in FIG. 2. The coordinates of these sensor areas are again stored in a memory for instance 110 that is, for instance, accessible by the controller related to a focus setting. The area parameters in operation may be retrieved from 110 by controller 109 as being associated with a focus setting and provided by the controller 109 to the image processor 111 for creating a panoramic image from the sensor data based on the defined individual images related to a focus setting. Instead of saving a sensor area, one may also determine again a merge line that determines what the active area of a sensor should be. As an example, merge lines 310 and 311 are provided. It is noted that the merge lines are drawn as straight lines perpendicular to the base of a rectangular window. However, such a limitation is not required. First of all, a sensor does not need to be rectangular, and the active window of a sensor is also not required to be rectangular. Furthermore, a merge line may have any orientation and any curved shape.

One may repeat the steps for different distances and also for different lighting and image depth conditions and record focus setting and aperture setting and shutter setting and related sensor area parameters and/or merge lines in a memory. Such a system allows a camera to provide point-and-click capabilities for generating panoramic images from 2 or more individual images using a camera with at least two sensor/lens units.

Figure 4:
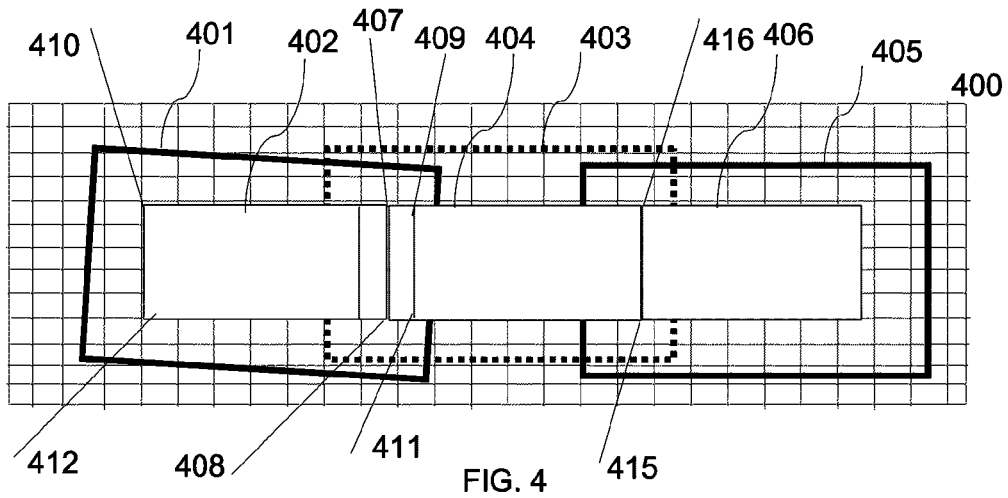
FIG. 4 illustrates a panoramic image created in accordance with yet another aspect of the present invention.

In a further embodiment, one may be less accurate with the relative position of sensor/lens units in relation to the central unit. For instance, a sensor/lens 101 may have a vertical shift of translation to a reference unit 102 as is shown in FIG. 4. Herein, window 405 has a lateral shift relative to window 403. Furthermore, sensor/lens 103 may be rotated relative to 102. This is shown as a rotated window 401. It should be clear that a window may have a rotational deviation and a vertical and horizontal deviation. These deviations may be corrected by an image processor. It is important that the sensor/lens units are positioned so that sufficient overlap of images in effective sensor areas can be achieved, with minimal distortion. This is shown in FIG. 4. At a certain distance, related to a focus setting of the sensor/lens 102 sensor areas 402, 404 and 406 are determined to be appropriate to generate a panoramic image from these images. One may then again store the coordinates of the effective sensor areas in a memory 110, related to a sensor/lens focus. These coordinates may be accessed by controller 109 and provided to the image processor 111 for processing the images. The processor may apply these coordinates directly. In a further embodiment, one may store a transformed image in a buffer applying rectangular axes.

In FIG. 4 to illustrate the aspect of sensor area coordinates is illustrated by identified points 409, 410, 411 and 412, which identify the active sensor area to be used for the panoramic image. The rectangle determined by corners 409, 410, 411, 412 is rotated inside the axes of the image sensor 103 related to window 401. One may provide the image processor 109 with transformational instructions to create standard rectangular axes to refer to the pixels for processing. One may also write the data related to the pixels into a memory buffer that represents the pixels in standard rectangular axes. The coordinates also include the coordinates of the separation/merge line 407-408 between windows 401 and 403. One may also provide the coordinates of the separation line 415-416 between windows 403 and 405. The image processor may be instructed, for instance by the controller 109 which retrieves all the relevant coordinates from memory 110 based on a setting of a reference lens, to combine the active sensor area image of 407, 408, 410, 412 of sensor unit 103 with active sensor area 407, 408, 415, 416 of sensor unit 102. One should keep in mind that the coordinates of line 407-408 in sensor 102 may be different from the coordinates of line 407-408 in sensor 103 if one does not use standardized buffered images.

In a further embodiment, one may start calibration on a far distance scene, thus assuring that one can at least create a far distance scene panoramic image.

In yet a further embodiment, one may start calibration on a near distance scene, thus assuring that one can at least create a near distance scene panoramic image. In one embodiment, a near distance scene may be a scene on a distance from about 3 feet. In another embodiment, a near distance scene may be a scene on a distance from about 5 feet. In another embodiment, a near distance scene may be a scene on a distance from about 7 feet.

Near distance panoramic images, may for instance be an image of a person, for instance when the camera is turned so that 2 or more, or 3 or more sensor/lens units are oriented in a vertical direction. This enables the unexpected results of taking a full body picture of a person, who is standing no further than 3 feet, or no further than 5 feet, or no further than 7 feet from the camera.

Figure 5:
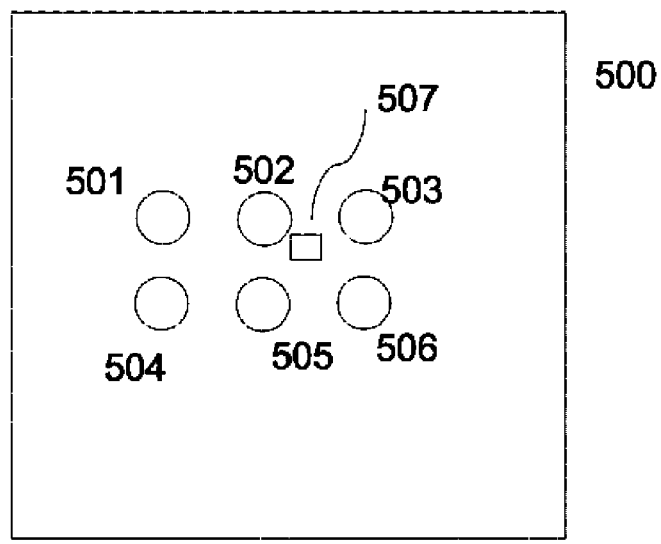
FIG. 5 is a diagram of a camera for panoramic images in accordance with an aspect of the present invention.

In illustrative embodiments provided herein sensor/lens units with three lenses are provided. The embodiments generally provided herein will also apply to cameras with two lenses. The embodiments will generally also apply to cameras with more than three lenses. For instance, with 4 lenses, or to cameras with two rows of 3 lenses, or any configuration of lenses and/or sensor units that may use the methods that are disclosed herein. These embodiments are fully contemplated. FIG. 5 shows a diagram of an embodiment of a camera 500, which may be embodied in a camera phone, being a mobile computing device such as a mobile phone with a camera. This diagram shows 6 lenses in two rows. One row with lenses 501, 502 and 503, and a second row with lenses 504, 505 and 506. The camera also has at least an autofocus sensor 507 which will be able to assist a reference lens to focus. All lenses may be driven into focus by a focus mechanism that is controlled by a controller.

Motor Driven Calibration

Figure 6:
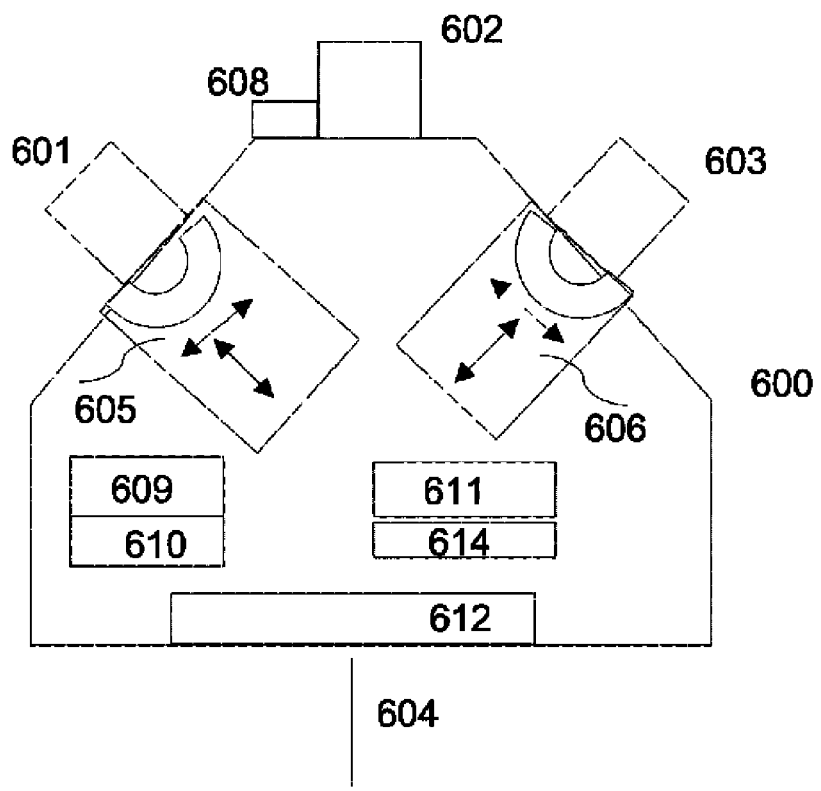
FIG. 6 is a diagram of a camera for panoramic images in accordance with another aspect of the present invention.
Figure 7:
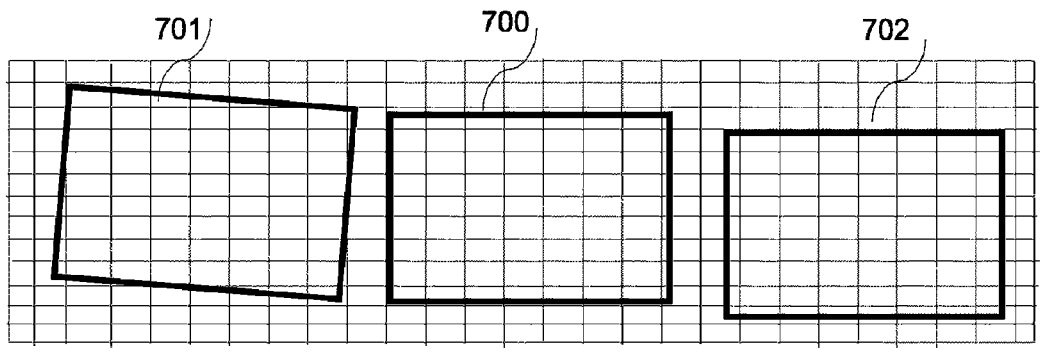
FIG. 7 illustrates a panoramic image created in accordance with a further aspect of the present invention.

In a further embodiment of a camera, one may provide a sensor/lens unit with one or more motors or mechanism, the motors or mechanism not being only for distance focus. Such a mechanism may provide a sensor/lens unit with the capability of for instance vertical (up and down) motion with regard to a reference sensor/lens unit. Such a motor may provide a sensor/lens unit with the capability of for instance horizontal (left and right) motion with regard to a reference sensor/lens unit. Such a motor may provide a sensor/lens unit with the capability of for instance rotational (clockwise and/or counterclockwise rotational motion) motion with regard to a reference sensor/lens unit. Such an embodiment is shown in FIG. 6. Rotational motion may turn the turned sensor/lens unit towards or away from a reference lens. Rotational motion may also rotate a sensor plane on an axis perpendicular to the sensor plane.

The camera of FIG. 6 is shown in diagram as 600. The camera has again 3 sensor/lens units as was shown in FIG. 1. These units are 601, 602 and 603. Unit 602 may be considered to be the reference unit in this example. It has a autofocus unit 608 associated with it. Each lens can be positioned in a correct focus position by a mechanism or a motor such as a piezo-motor. The system may work in a similar way as shown in FIG. 1. The camera may be pointed at an object at a certain distance. Autofocus unit 608 helps lens of unit 602 focus.

Data associated with the distance is stored in a memory 610 that is accessible by a controller 609. Associated with this setting are the related focus settings of lenses of 601 and 603. Thus, a setting of the lens of 602 will be associated with a focus setting of 601 and 603 which will be retrieved from memory 610 by controller 609 to put the lenses of 601 and 603 in the correct focus position. An image processor 611 will process the images provided by sensor units 601, 602 and 603 into a panoramic image, which may be displayed on display 612. The panoramic image may be stored in a memory 614. It may also be provided on an output 604.

The sensor unit 601 may be provided with a motor unit or a mechanism 605 that is able to provide the sensor unit with a translation in a plane, for instance the sensor plane. The motor unit 605 may also have a rotational motor that provides clockwise and counterclockwise rotation to the sensor unit in a plane that may be the plane of the sensor and/or that may be in a plane not being in the sensor plane, so that the sensor unit 601 may be rotated, for instance, towards or away from unit 602. Sensor unit 603 has a similar motor unit or mechanism 606. Sensor unit 602 is in this example a reference unit and has in this case no motor unit for translational and rotational movements; however, it has a focus mechanism. Each unit of course has a focus motor for each lens. These motors are not shown in FIG. 6 but may be assumed and are shown in FIG. 1.

The calibration steps with the camera as provided in diagram in FIG. 6 work fairly similar to the above described method. One will start at a certain distance and lighting conditions and with unit 608 have a focus setting determined for 602 which will be associated with a focus setting for units 601 and 603 and which will be stored in memory 610 to be used by controller 609. Assume that the sensor units are not perfectly aligned for creating an optimal panoramic image. The sensor unit 601, 602 and 603 show the images of 702, 700 and 701. For illustrative purposes, a space between the images is shown, the images thus having no overlap. This situation of no overlap may not occur in real life if for instance no zoom lenses are used. However, the method provided herein is able to address such a situation if it occurs and thus is shown.

Figure 8:
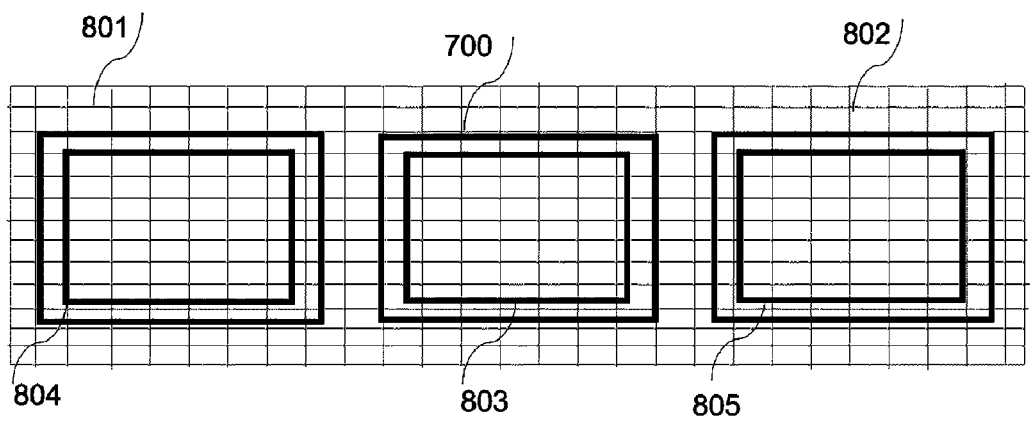
FIG. 8 illustrates a panoramic image created in accordance with yet a further aspect of the present invention.
Figure 9:
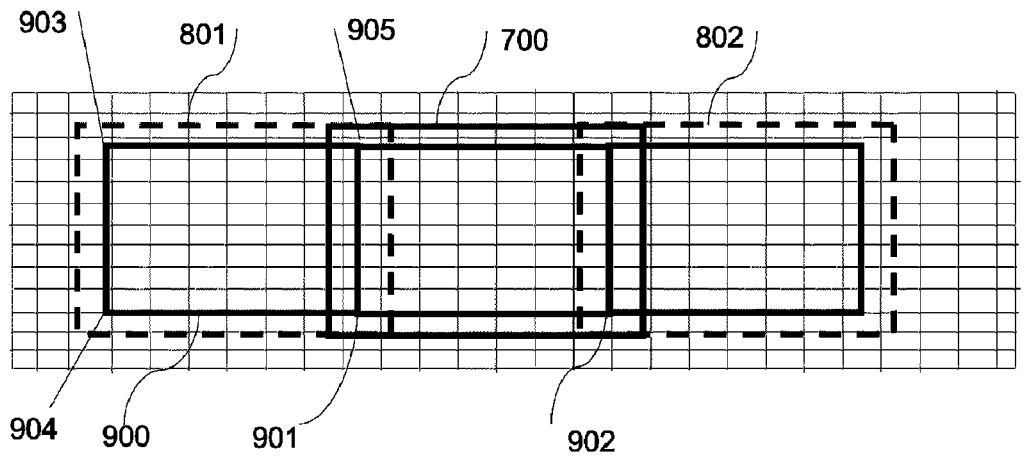
FIG. 9 illustrates a panoramic image created in accordance with yet a further aspect of the present invention.

As a next step the motor units 605 and 606 are instructed to align the windows 701 and 702 with 700. This is shown in FIG. 8. Herein, windows 801 and 802 created by the sensor units 603 and 601 which were adjusted in position by the motor units 606 and 605. It may be determined that sensor areas 804 and 805 need to be combined or registered with area 803 as shown in FIG. 8 to generate an optimal panoramic image by image processor 611, which may require a lateral movement of units 601 and 603 by mechanisms 605 and 606. Furthermore, it is determined that sensor areas 803, 804 and 805 provide the best panoramic image for the applied distance in a stitched and registered situation. The motor units are then instructed to put the sensor units 601 and 603 in the positions that provide the correct image overlap as shown in FIG. 9. This creates a panoramic image formed by image sensor areas 804, 803 and 805 touching at position 901 and 902 as shown in FIG. 9 and forming panoramic image 900. All motor instructions to achieve this setting are stored in memory 610 where it is associated with a focus setting determined by unit 608. Furthermore, also stored in memory 610 are the coordinates of the respective sensor areas and the separation lines that will be retrieved by controller 609 and provided to image processor 611 to create an optimal panoramic image. These coordinates are also associated with a focus setting. As an illustrative example of the coordinates 903, 904 and 905 are shown as part of defining the active image sensor area of window 801. By knowing the active sensor areas per sensor including the separation lines, one may easily combine the different images into a stitched or panoramic image. If required, one may define a search area which can be very narrow to optimize stitching and to correct for any alignments inaccuracies by the image processor.

One can repeat the calibration setting for different distances. There may be a difference in field of view between images at difference distances for instance due to the digital multiplier of a sensor unit. Also, parallax may contribute to a need to adjust angles of the sensor/lens units 601 and 603. Zoom settings, of course, will also affect the field of view. It may be possible to align the sensor/lens units in one plane in the manufacturing phase without adjusting the relative position of sensor/lens units. It may still be beneficial to adjust the relative settings of the sensor/lens units. In such a case, the motors or mechanisms may for instance only be rotational motors.

Figure 10:
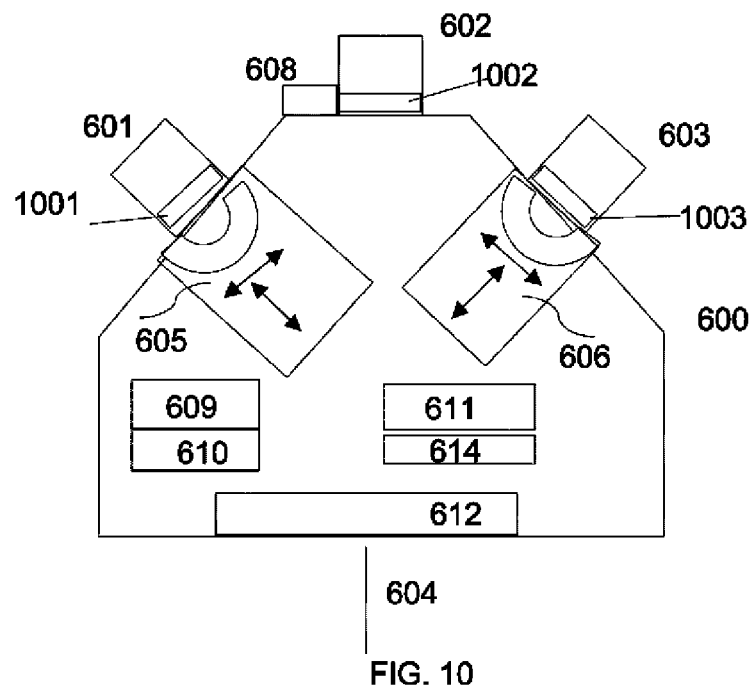
FIG. 10 is a diagram of a camera for panoramic images in accordance with another aspect of the present invention.

For instance, zoom motors may be required in case the lenses are zoom lenses. In that case, the field of view changes with a changing zoom factor. Such a camera is shown in diagram in FIG. 10. The camera has the same elements as the camera shown in FIG. 6, including a distance focus motor for each lens that are not shown but are assumed. Furthermore, the camera of FIG. 10 has a zoom mechanism 1001 for sensor/lens unit 601, a zoom mechanism 1002 for sensor/lens unit 602, and a zoom mechanism 1003 for sensor/lens unit 603. Calibration of the camera of FIG. 10 works in a similar way as described earlier, with the added step of creating settings for one or more zoom settings per distance settings. A zoom mechanism may be controlled by a controller. A calibration step may work as follows: the lens of unit 602 is set in a particular zoom setting by zoom mechanism 1002. This zoom setting is stored in memory 610 and the lenses of units 601 and 603 are put in a corresponding zoom position with mechanisms 1001 and 1003. The instructions to units 1001 and 1003 to put lenses of 601 and 603 in their corresponding zoom positions are stored in memory 610 and associated with the zoom position of 602 affected by 1002. So, when the lens of 602 is zoomed into position, controller 609 automatically puts the lenses of 601 and 603 in corresponding positions by retrieving instructions from memory 610 and by instructing the motors of 1001 and 1003.

In a further embodiment, the mechanism of 1002 may contain a sensor which senses a zoom position. In such an embodiment, a user may zoom manually on an object thus causing the lenses of 601 and 603 also to zoom in a corresponding manner.

The combination of a distance with a zoom factor of unit 602, which is the reference unit in this example, determines the required position, zoom and focus of the units 601 and 602. As above, all instructions to achieve these positions for 601 and 603 are associated with the corresponding position of the reference unit 602 and stored in memory 610 which is accessible to controller 609. Included in the stored instructions may be the coordinates of the actively used sensor areas, which will be provided to image processor 611 to process the appropriate data generated by the sensors into a stitched and panoramic image as was provided earlier above.

As a consequence of creating a panoramic image of several images one may have created an image of considerable pixel size. This may be beneficial if one wants to display the panoramic image on a very large display or on multiple displays. In general, if one displays the panoramic image on a common display, or for instance on the camera display such high resolution images are not required and the processor 611 may have an unnecessary workload, in relation to what is required by the display. In one embodiment, one may want to provide the controller 609 with the capability to calculate the complete area of the panoramic image and the related pixel count. The controller 609 may have access to the pixel density that is required by a display, which may be stored in a memory 610 or may be provided to the camera. Based on this information the controller may provide the image processor with a downsampling factor, whereby the images to be processed may be downsampled to a lower pixel density and the image processor can process images in a faster way on a reduced number of pixels. Such a downsizing may be manually confirmed by a user by selecting a display mode. Ultimate display on a large high-quality HD display may still require high pixel count processing. If, for instance, a user decides to review the panoramic image as a video only on the camera display, the user may decide to use a downsampling rate which increases the number of images that can be saved or increase the play time of panoramic video that can be stored in memory.

Figure 11:
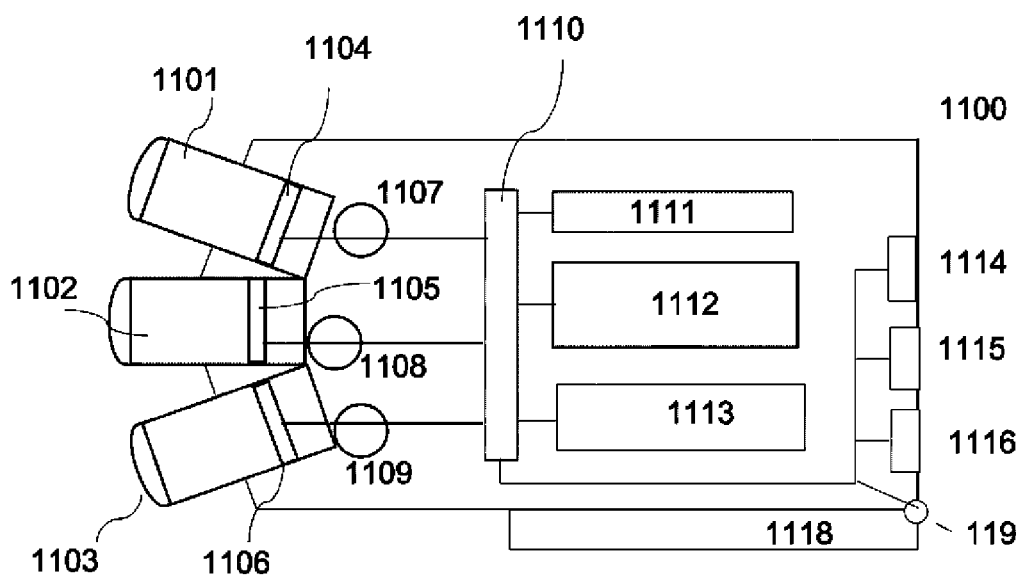
FIG. 11 is a diagram of a camera for panoramic images in accordance with yet another aspect of the present invention.

FIG. 11 shows an illustrative embodiment 1100 of a camera that can record at least 3 images concurrently of a scene from different perspectives or angles. The camera may provide a single multiplexed signal containing the three video signals recorded through 3 different lenses 1101, 1102 and 1103 and recorded on image sensors 1104, 1105 and 1106. The sensors are connected on a network which may be a bus controlled by bus controller 1110 and may store their signals on a storage medium or memory 1112 which is also connected to the network or bus. Further connected to the network is a controller 1111 with its own memory if required, which controls the motor units and may provide instructions to the image processor 1113. Also connected to the network are three motors units 1107, 1108 and 1109 for zooming and focusing lenses and moving lenses or lens units laterally or rotationally as required to put the lenses in one plane. Motor unit 1108 may only have zoom and focus capabilities in a further embodiment as lens unit 1102/1105 may be treated as the reference lens. The motors may be controlled by the controller 1111. Also connected to the network is an image processor 1113 with its own memory for instruction storage if required. Furthermore, the camera may have a control input 1114 for providing external control commands, which may include start recording, stop recording, focus and zoom commands. An input command may also include record only with center lens and sensor. An input command may also include record with all three lenses and sensors.

The camera also may have an output 1115 which provides a signal representing the instant image at one or all of the sensors. An output 1116 may be included to provide the data that was stored in the memory 1112. It should be clear that some of the outputs may be combined to fulfill the above functions. Furthermore, the camera may have additional features that are also common in single lens cameras, including a viewer and the like. A display 1118 may also be part of the camera. The display may be hinged at 119 to enable it to be rotated in a viewable position. The display is connected to the bus and is enabled to display the panoramic image which may be a video image. Additional features are also contemplated. The camera has at least the features and is enabled to be calibrated and apply methods as disclosed herein.

In a first embodiment, a user may select if images from a single lens or of all three lenses will be recorded. If the user selects recording images from all three lenses, then via the camera controller a control signal may be provided that focuses all three lenses on a scene. Calibrated software may be used to ensure that the three lenses and their control motors are focused correctly. In a further embodiment, the image signals are transmitted to the memory or data storage unit 1112 for storing the video or still images.

In yet a further embodiment, the signals from the three lenses may be first processed by the processor 1113 to be registered correctly into a potentially contiguous image formed by 3 images that can be displayed in a contiguous way. The processor in a further embodiment may form a registered image from 3 images that may be displayed on a single display.

The processor in yet a further embodiment may also process the images so that they are registered in a contiguous way if displayed, be it on one display or on three different displays.

In yet a further embodiment, the processor may register the three images and multiplex the signals so that they can be displayed concurrently on three different displays after being demultiplexed.

After being processed the processed signals from the sensors can be stored in storage/memory unit 1112. In yet a further embodiment, the signals are provided on an output 1115.

The reason for the different embodiment is the preference of a user for display and to make a camera potentially less complex and/or costly. One may, for instance, elect to make sure that all lenses and their controls are calibrated as to focus and/or zoom correctly. One may register images already in the camera through the processor 1113. However, one may also provide the three images either directly or from memory as parallel signals to a computing device such as a personal computer. The computing device may provide the possibility to select, for instance in a menu, the display of an image of a single lens/sensor. It may also provide a selection to display all three images in a registered fashion. The computing device may then have the means to register the images, store them in a contiguous fashion in a memory or a storage medium and play the images in a registered fashion either on one display or on three different displays.

For instance one may provide a signal available on output 1116, which may be a wireless or radio transmitter. Accordingly, a camera may make 3 or more video images, which may be multiplexed and registered or multiplexed and not registered available as a radio signal. Such radio signal may be received by a receiver and provided to a computing device that can process the signals to provide a registered image. A registered image may be provided on one display. It may also be provided on multiple displays.

There are different combinations in processing, multiplexing, registering, storing, outputting and displaying. One may elect to do most processing in the camera. One may also do the majority of the processing in the computing device and not in the camera. One may provide lens setting parameters with image data to facilitate processing by a computing device for processing and consequently displaying the registered images.

Figure 12:
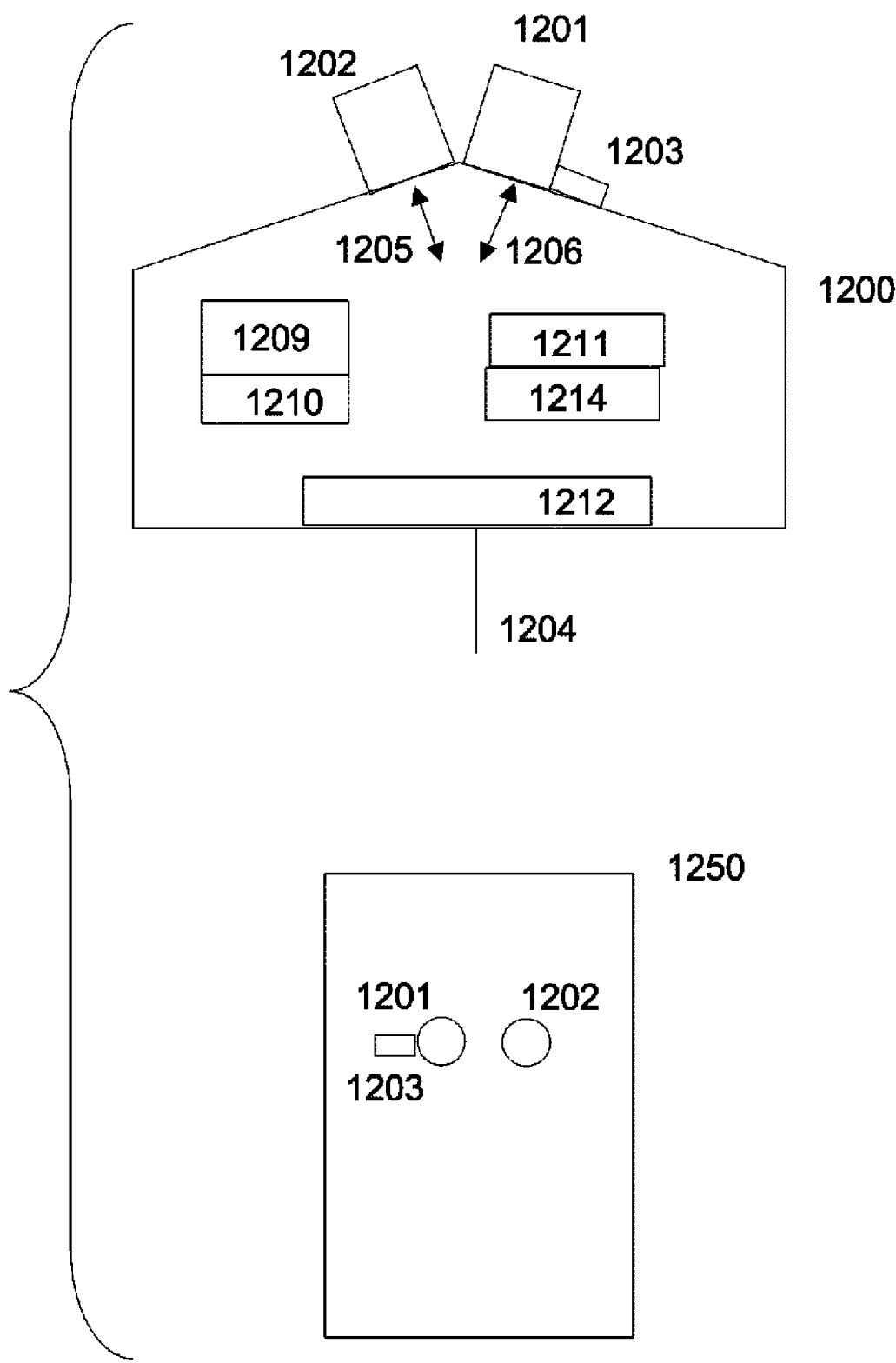
FIG. 12 is a diagram of a camera for panoramic images in accordance with yet another aspect of the present invention.

FIG. 12 shows a diagram of a camera for creating and displaying panoramic images by using 2 sensor/lens units 1201 and 1202 and having at least one autofocus unit 1203. Sensor/lens unit 1202 has at least a focus motor 1205 and sensor/lens unit 1201 has at least a focus motor 1206. The camera also has a controller 1209 which may have its separate memory 1210, which may be ROM memory. The camera also has an image processor 1211 which can process image data provided by sensor/lens units 1201 and 1202. A memory 1214 may store the panoramic images generated by the image processor. Motors may be controlled by the controller 1209, based in part on instructions or data retrieved from memory 1210 related to a setting of the autofocus unit 1203. Associated with a focus setting may be coordinates of sensor areas within sensors of units 1201 and 1202 of which the generated data will be processed by the image processor 1211. The controller 1209 may provide processor 1211 with the required limitations based on a focus setting. All settings may be determined during calibration steps as described earlier herein. A display 121 may be included to display the panoramic image. Signals related to a panoramic image may be provided on output 1204. In a further embodiment lens unit 1202 may be provided with a motor unit that can control lateral shifts and/or rotation of 1202 in relation to unit 1201. Settings of this motor unit may also be determined in a calibration setting. Diagram 1200 provides a top view and cross sectional view of the camera. Diagram 1250 provides a front view.

Figure 13:
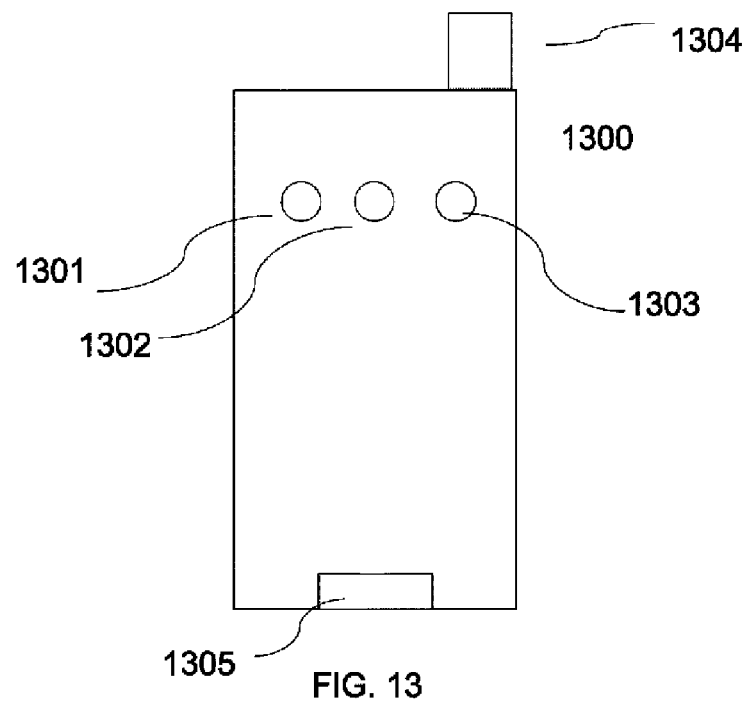
FIG. 13 is a diagram of a camera for panoramic images in accordance with yet another aspect of the present invention.

In one embodiment, a multi-lens camera is part of a mobile computing device, which may be a mobile phone or a Personal Digital Assistant (PDA) or a Blackberry® type of device, which may be provided with 2 or more or 3 or more lenses with related photo/video sensors which are calibrated to take a combined and registered image which may be a video image. A diagram is shown in FIG. 13 of a mobile computing device 1300 which may communicate in a wireless fashion with a network, for instance via an antenna 1304. While the antenna is shown it may also be hidden within the body. As an illustrative example the device has 3 lenses 1301, 1302 and 1303 which are enabled to record a scene in a way wherein the three individual images of the scene can be combined and registered into a wide view panoramic image, which may be a video image. The device has a capability to store the images in a memory. The device has a processor that can create a combined image. The combined image, which may be a static image such as a photograph or a video image can be stored in memory in the device. It may also be transmitted via the antenna 1304 or via a transmission port for output 1305 to an external device. The output 1305 may be a wired port for instance a USB output. It may also be a wireless output, for instance a Bluetooth output.

Figure 14:
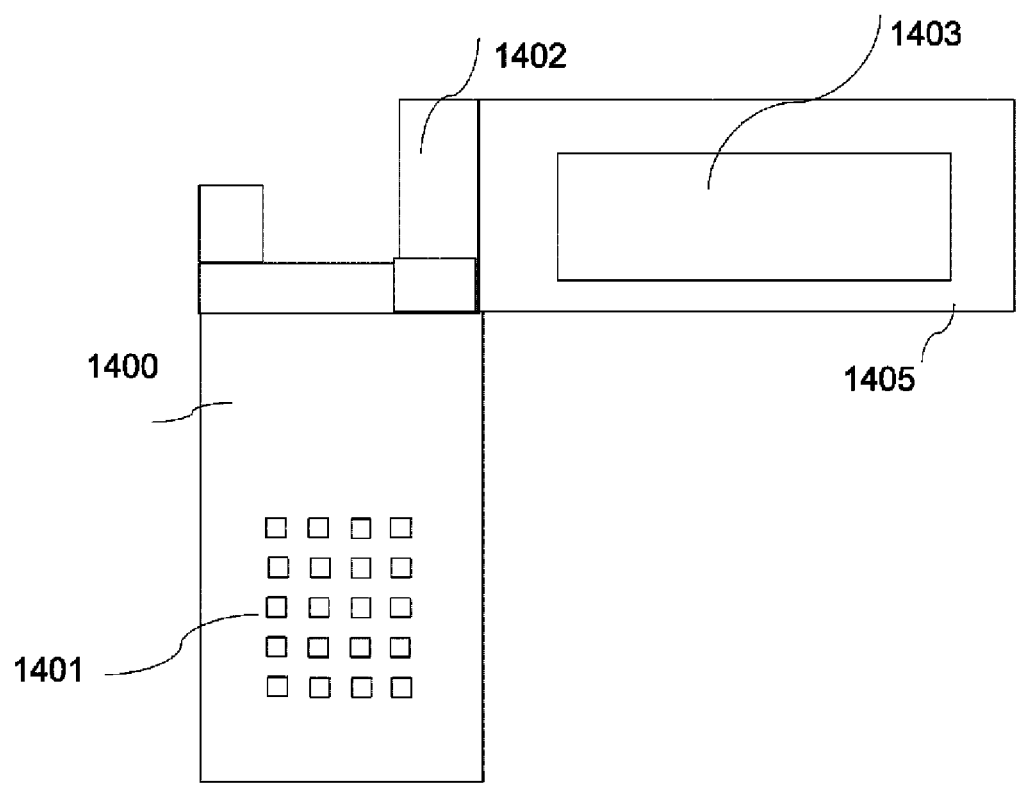
FIG. 14 is a diagram of a camera for panoramic images in accordance with yet another aspect of the present invention.

Viewing of the image may take place real-time on a screen 1403 of a device 1400 as shown in FIG. 14, which may be a different view of the device of FIG. 13. For instance, FIG. 13 may be a view of the device from the front and FIG. 14 from the back of the device. In FIG. 14 it is shown that the device is comprised of at least two parts 1400 and 1405, connected via a hinge system with connectors 1402 that allows the two bodies to be unfolded and body 1405 turned from facing inside to facing outside. Body 1400 may contains input controls such as keys. Body 1405 may contain a viewing display 1403. The lenses of FIG. 13 are on the outside of 1400 in FIG. 14 and not visible in the diagram. Body 1405 with screen 1403 may serve as a viewer when recording a panoramic image with the lenses. It may also be used for viewing recorded images that are being played on the device. The device of FIG. 14 may also receive via a wireless connection an image that was transmitted by an external device. Furthermore, the device of FIG. 14 may also have the port 1405 that may serve as an input port for receiving image data for display on display screen 1403.

In one embodiment, one may assume that the surface of the device as shown in FIG. 13 is substantially flat. In that case, the camera lenses 1301, 1302 and 1303 have a combined maximum field of view of 180 degrees. This may be sufficient for cameras with 3 lenses wherein each lens has a maximum field-of-vision of 60 degrees. In a further embodiment, one may have more than 3 lenses, enabling a combined field-of-vision of more than 180 degrees, or the field of view of the lenses adds up to more than 180 degrees. In such a further embodiment, the surface may be curved or angled, allowing 3 or more lenses to have a combined field-of-view of greater than 180 degrees.

A camera on a mobile phone is often considered a low cost accessory. Accordingly, one may prefer a multi-lens camera that will create panorama type images (either photographs and/or video) at the lowest possible cost. In such a low cost embodiment one may, for instance, apply only a two lens camera. This is shown in diagram in FIG. 15 with camera phone 1500 with lenses 1501 and 1502. In diagram in FIG. 16 it is shown how scenes are seen by the lenses. Lens 1501 'sees' scene 1602 and lens 1502 'sees' scene 1601. It is clear that the two sensor/lens units are not well oriented in regard to each other. As was described earlier above one may calibrate the camera to achieve an optimal and aligned panoramic image by good calibration. A processor in the camera may stitch the images together, based on control input by a calibrated controller. From a calibration it may be decided that lines 1603 and 1604 are merge lines which may be applied to image data. This again allows created registering of images without having to search for a point of registration. The 'stitching' may be as simple as just putting defined parts of the images together. Some edge processing may be required to remove the edge between images if it's visible. In general, the outside of an image may suffer from lens distortion.

Figure 17:
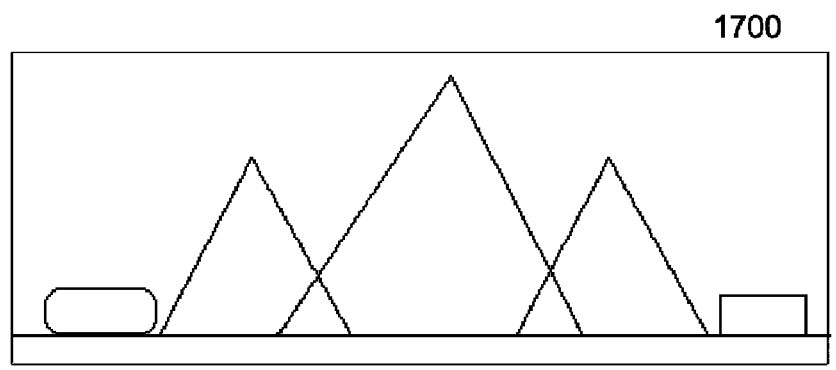
FIG. 17 illustrates a panoramic image created in accordance with yet a further aspect of the present invention.

FIG. 17 shows then the registered and combined image 1700. The image may be a photograph. It may also be a video image.

Figure 15:
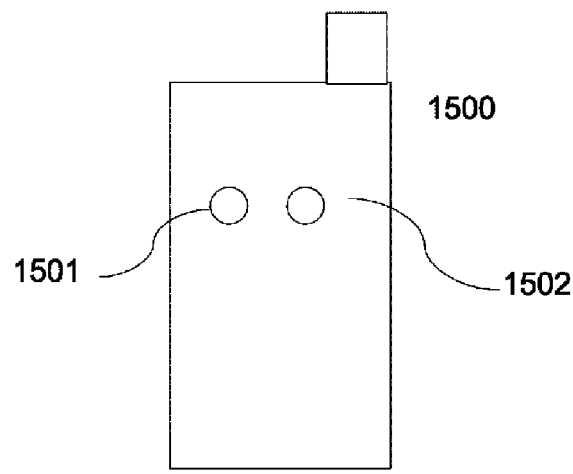
FIG. 15 is a diagram of a camera for panoramic images in accordance with yet another aspect of the present invention.
Figure 16:
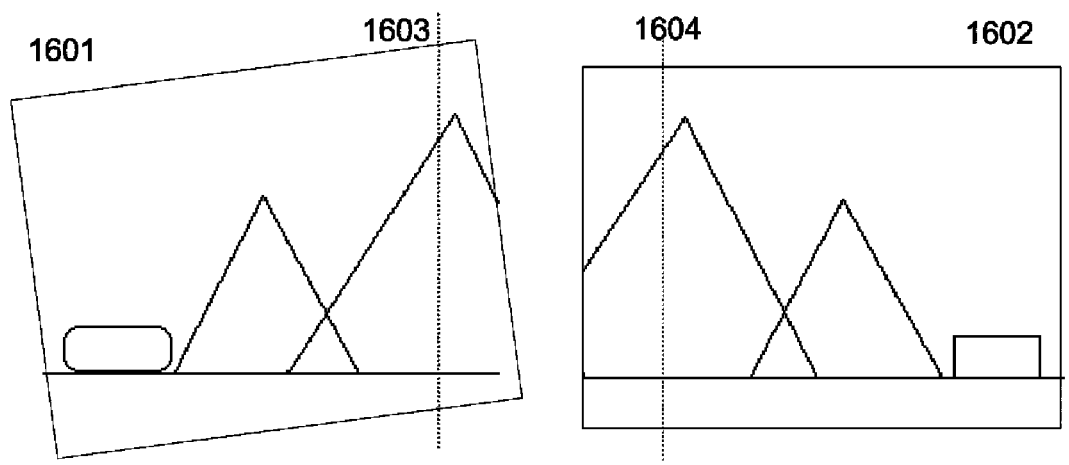
FIG. 16 illustrates a panoramic image created in accordance with a further aspect of the present invention.

The embodiment as provided in FIG. 15 and its result shown in FIG. 17 is unusual in at least one sense that it creates a center of an image by using the edges of the images created by two lenses. In general, as in some aspects of the present invention, one assigns one lens to the center and presumably an important part of the image. The above embodiment allows for creating a good quality image by using inexpensive components and adjusting the quality of a combined image by a set of instructions in a processor. Except for a focus mechanism not other motors are required. Thus, relatively inexpensive components, few moving parts and a calibrated controller and an image processor with memory provide a desirable consumer article. Prices of electronic components go down while their performance constantly increases. Accordingly, one may create the above camera also in a manufacturing environment that not applies expensive manufacturing tolerances on the manufacturing process. Deviations in manufacturing can be off-set by electronics performance.

Figure 18:
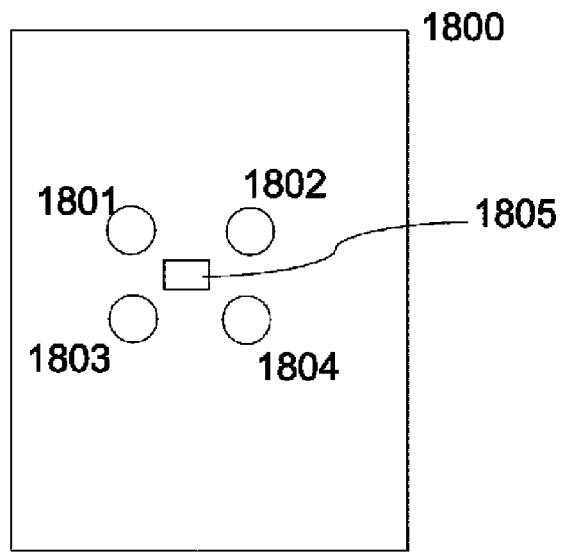
FIG. 18 is a diagram of a camera for panoramic images in accordance with yet another aspect of the present invention.

The methods provided herein may create a panoramic image that makes optimal use of available image sensor area. In some cases, this may create panoramic images that are not conforming to standard image sizes. One may as a further embodiment of the present invention implement a program in a controller that will create a panoramic image of a predefined size. Such a program may take actual sensor size and pixel density to fit a combined image into a preset format. In order to achieve a preferred size it may cause to lose image area. One may provide more image size options by for instance using two rows of sensor/lens units as for instance shown in FIG. 5 with two rows of 3 image sensors/lenses, or as shown in FIG. 18 by using two rows of 2 image sensors/lenses. Especially if one wants to print panoramic images on standard size photographic paper one may try to create an image that has a standard size, or that conforms in pixel count with at least one dimension of photographic print material.

In a further embodiment of the present invention one may adjust the size of an image sensor to allow creating standard size images or at least with one dimension such as the vertical dimension in a standard size and standard quality or higher.

Panoramic image cameras will become very affordable as prices of image sensors continue to fall over the coming years. By applying the methods disclosed herein one can create panoramic cameras with inexpensive sensors and electronics, having an excess of sensor area and/or lenses substitute for a need for motors, mechanisms and mechanical drivers.

It is to be understood that deviations of placement of sensors in the drawings herein may have been greatly exaggerated. It is to be expected that mis-alignment of sensors can be limited to about 1 mm or less. That may still represent a significant amount of pixels. Rotational positioning deviations may be less than about 2 degrees or 1 degree. That may still require significant sensor area adjustment. For instance, with a sensor having 3000×2000 pixels at a rotation of 1 degree without a lateral shift may have a shift of pixels of about 50 pixels in an y direction and a shift of 1 pixel in an x direction. Clearly, such a deviation requires a correction. However, the required mechanical adjustment in distance may well be within the limits of for instance piezo-motors. For larger adjustments other types of known motors may be applied. It also clear that though shifts of 50 pixels or even higher are unwanted, they still leave significant sensor area for usable image.

Due to the multiplier effect of the image sensor, zoom effects and other effects related to lens, lens position, image sensors and lighting conditions and the like one may have different lens settings of the lenses related to a reference lens. It is clearly the easiest to generate as may different conditions and settings during calibration as possible and save those settings with the related image areas and further stitching and blending parameters in a memory. A certain setting under certain conditions of a reference will be associated with related settings such as focus, aperture, exposure time, lens position and zoom of the other lenses. These positions may also be directly related with the active areas and/or merge lines of image sensors to assist in automatically generating a combined panoramic image. This may include transformation parameters for an image processor to further stitch and/or blend the separate images into a panoramic image.

It should be clear that lens settings between two extreme settings, such as for instance close-up object, or far away object may be significant. It is also clear that there may be only a finite number of calibrated settings. One may provide an interpolation program that interpolates between two positions and settings. The images may be video images. One may move a camera, for instance to follow a moving object. One may provide instructions, via a controller for instance, to keep a reference lens in a predetermined setting, to make sure that when the object temporarily leaves the field of vision of the reference lens that settings are not changed.

In a further embodiment of the present invention, images in a static format, in a video format, in a combined and registered format and/or in an individual format may be stored on a storage medium or a memory that is able to store a symbol as a non-binary symbol able to assume one of 3 or more states, or one of 4 or more states.

A combined, also called panoramic image exists as a single image that can be processed as a complete image. It was shown above that a combined and registered image may be created in the camera or camera device, by a processor that resides in the camera or camera device. The combined image, which may be a video image, may be stored in a memory in the camera or camera device. It may be displayed on a display that is a part or integral part of the camera device and may be a part of the body of the camera device. The combined image may also be transmitted to an external display device. A panoramic image may also be created from data provided by a multi-sensor/lens camera to an external device such as a computer.

Currently, the processing power of processors, especially of DSPs or Digital Signal Processors is such that advanced image processing methods may be applied real-time on 2D images. One of such methods is image extraction or segmentation of an image from its background. Such methods are widely known in medical imaging and in photo editing software and in video surveillance. Methods for foreground/background segmentation are for instance described in U.S. Pat. No. 7,424,175 to Lipton et al., filed on Feb. 27, 2007; U.S. Pat. No. 7,123,745 to Lee issued on Oct. 17, 2006; U.S. Pat. No. 7,227,893 issued on Jun. 5, 2007, which are incorporated herein by reference in their entirety and in many more references. For instance, Adobe's Photoshop provides the magnetic lasso tool to segment an image from its background.

Current methods, which can be implemented and executed as software on a processor allows for a combined and registered image to be processed. For instance, such an image may be a person as an object. One may identify the person as an object that has to be segmented from a background. In one embodiment, one may train a segmentation system by identifying the person in a panoramic image as the to be segmented object. For instance, one may put the person in front of a white or substantially single color background and let the processor segment the person as the image. One may have the person assume different positions, such as sitting, moving arms, moving head, bending, walking, or any other position that is deemed to be useful.

In order to facilitate later tracking of the person by a camera, one may provide the person with easy to recognize and detectable marks at positions that will be learned by the segmentation software. These methods for segmentation and tracking are known. They may involve special reflective marks or special color bands around limbs and head. One may store the learned aspects and/or other elements such as statistical properties of a panoramic object such as a person in a memory and which can be applied by a processor to recognize, detect, segment and/or track a person with a multi-sensor/lens video camera. In one embodiment, a system detects, tracks and segments the person as an object from a background and buffers the segmented image in a memory, which may be a buffer memory.

In one embodiment, one may insert the segmented object, which may be a person, in a display of a computer game. The computer game may be part of a computer system, having a processor, one or more input devices which may include a panoramic camera system as provided herein and a device that provided positional information of an object, one or more storage devices and display. For instance, the computer game may be a simulation of a tennis game, wherein the person has a game controller or wand in his/her hand to simulate a tennis racket. The WII® game controller of Nintendo® may be such a game controller. The game display may insert the image of the actual user as created by the panoramic system and tracked, and segmented by an image processor into the game display. Such an insert of real-life motion may greatly enhance the game experience for a gamer. The computer game may create a virtual game environment. It may also change and/or enhance the appearance of the inserted image. The image may be inserted from a front view. It may also be inserted from a rear view by the camera. A gamer may use two or more game controllers, which may be wireless. A game controller may be hand held. It may also be positioned on the body or on the head or on any part of the body that is important in a game. A game controller may have a haptic or force-feedback generator that simulates interactive contact with the gaming environment.

Figure 19:
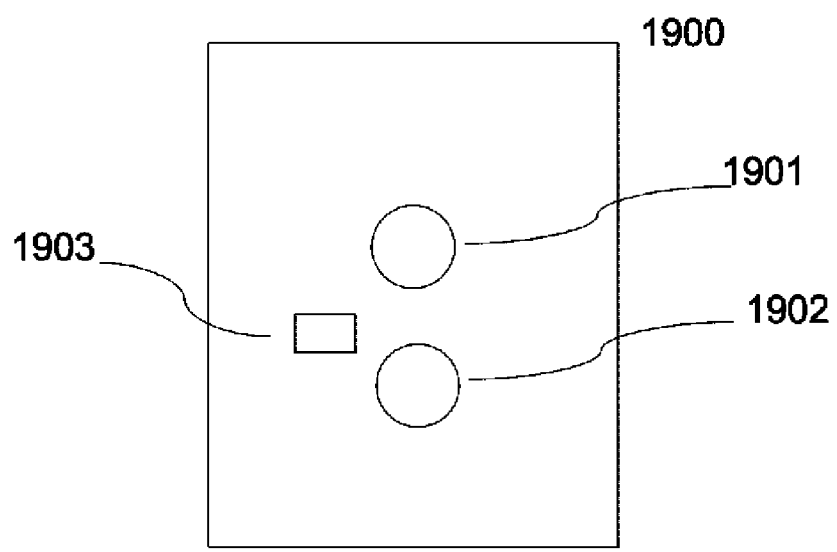
FIG. 19 is a diagram of a camera for panoramic images in accordance with yet another aspect of the present invention.

In general, gamers use a gaming system and play in a fairly restricted area, such as a bedroom that is relatively small. In such an environment, it is difficult to create a full body image with a single lens camera as the field of vision is generally too small. One may apply a wide angle lens or a fish-eye lens. These lenses may be expensive and/or create distortion in an image. A camera enabled to generate vertical panoramic images such as shown in FIG. 19 enables full body image games as provided above from a small distance. The camera as shown in diagram 1900 has at least two sensor/lens units 1901 and 1902 and at least one autofocus unit 1903. It is not strictly required to use one camera in one body with at least two lenses. One may also position at least two cameras with overlap in one construction and have an external computing device create the vertical panoramic image.

A person may have a length of about 1.50 meter or greater. In general, that means that the position of a camera with one lens has to be at least 300 cm away from the person, if the lens has a field-of-view of sixty degrees. The field of view of a standard 35 mm camera is less than 60 degrees and in most cases will not capture a full size image of a person at a distance of 3 meter, though it may have no trouble focusing on objects at close distances. It may, therefore, be beneficial to apply a panoramic camera as disclosed herein with either two or three lenses, but with at least two lenses to capture a person of 1.50 meter tall or taller at a distant of at least 1.50 meter. Other measurements may also be possible. For instance, a person may be 1.80 meter tall and needs to be captured on a full person image. This may require a camera or a camera system of at least 2 lenses and images sensors, though it may also require a camera or a camera system of 3 lenses and image sensors.

One may want to follow the horizontal movements of a gamer in a restricted area. In such a case the cameras as shown in FIG. 5 and FIG. 18 may be helpful.

A controller or a processor as mentioned herein is a computer device that can execute instructions that are stored and retrieved from a memory. The instructions of a processor or controller may act upon external data. The results of executing instructions are data signals. In the controller these data signals may control a device such as a motor or it may control a processor. An image processor processes image data to create a new image. Both a controller and a processor may have fixed instructions. They may also be programmable. For instance, instructions may be provided by a memory, which may be a ROM, a RAM or any other medium that can provide instructions to a processor or a controller. Processors and controllers may be integrated circuits, they may be programmed general processor, they may be processors with a specific instruction set and architecture. A processor and/or a controller may be realized from discrete components, from programmable components such as FPGA or they may be a customized integrated circuit.

Lens and sensor modules are well known and can be purchased commercially. They may contain single lenses. They may also contain multiple lenses. They may also contain zoom lenses. The units may have integrated focus mechanisms, which may be piezomotors or any other type of motor, mechanism or MEMS (micro-electro-mechanical system). Integrated zoom mechanisms for sensor/lens units are known. Liquid lenses or other variable are also known and may be used. When the term motor is used herein or piezo-motor it may be replaced by the term mechanism, as many mechanisms to drive a position of a lens or a sensor/lens unit are known. Preferably, mechanisms that can be driven or controlled by a signal are used.

Figure 20:
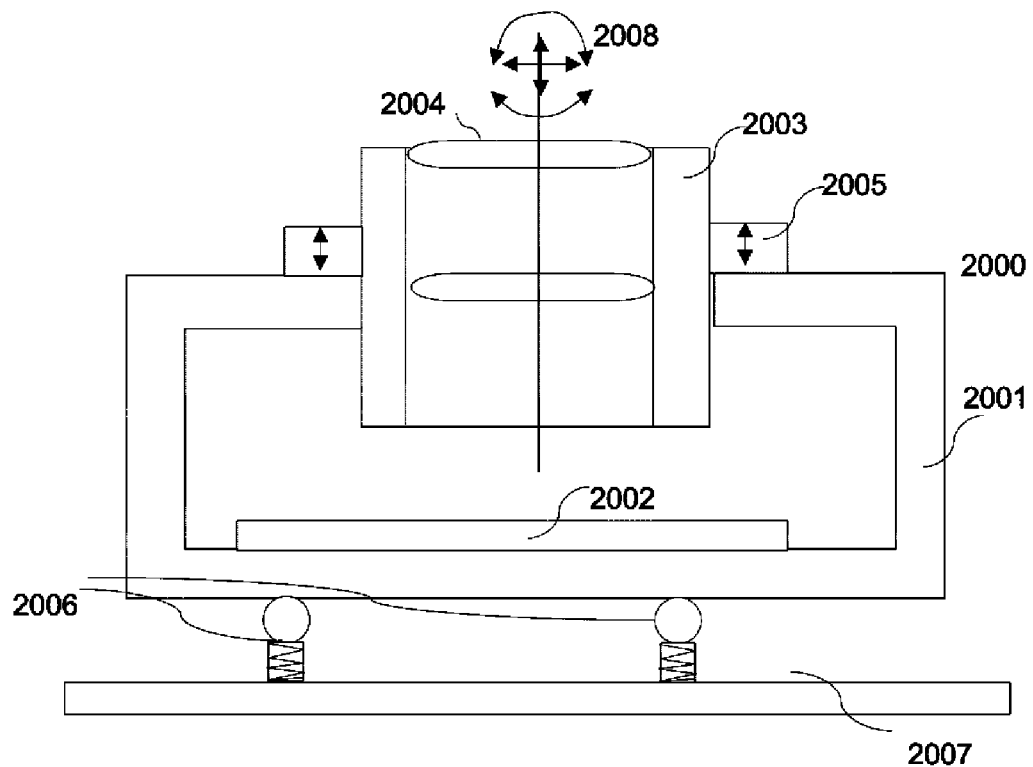
FIG. 20 is a diagram of a sensor/lens unit with moving mechanisms.

FIG. 20 shows a diagram of one embodiment of a sensor/lens unit 2000 in accordance with an aspect of the present invention. The unit has a body 2001 with a sensor 2002, a lens barrel 2003 which contains at least one lens 2004, the barrel can be moved by a mechanism 2005. The lens unit may also contain a zoom mechanism, which is not shown. The unit can be moved relative to the body of the camera by a moving mechanism 2006. The movements that may be included are lateral movement in the plane of the sensor, rotation in the plane of the sensor and rotation of the plane of the sensor, which provides the unit with all required degrees of freedom, as is shown as 208.

Figure 21:
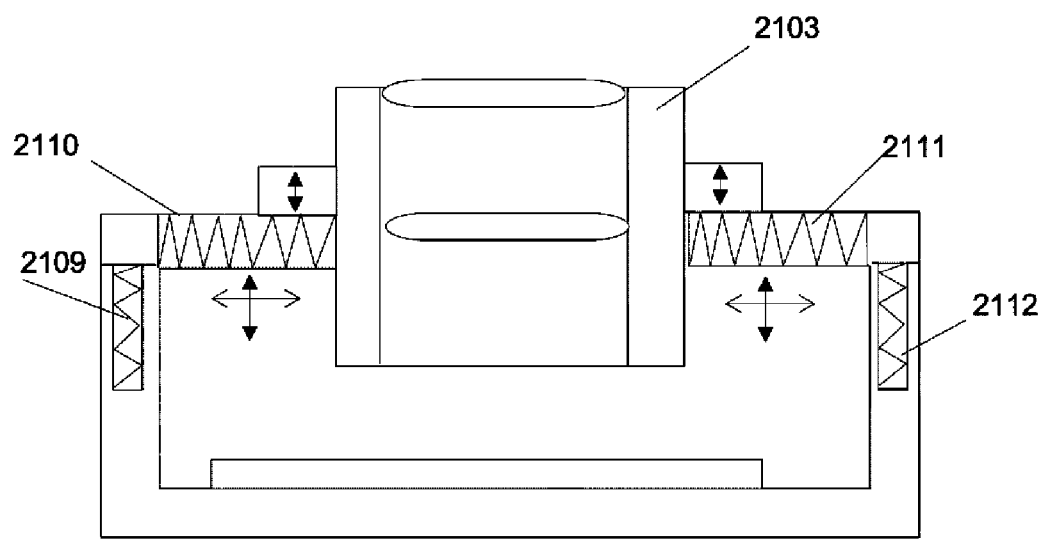
FIG. 21 is a diagram of another sensor/lens unit with moving mechanisms.

Other embodiments are possible. For instance, one may have the lens movable relative to the sensor as is shown in FIG. 21, wherein lens barrel 2103 may be moved in any plane relative to the sensor by lateral mechanisms 2109 and 2112 and by vertical mechanisms 2110 and 2111.

A mechanism may be driven by a controller. This means that the controller has at least an interface with the driving mechanisms in order to provide the correct driving signal. A controller may also have an interface to accept signals such as sensor signals, for instance from an autofocus unit. The core of a controller may be a processor that is able to retrieve data and instructions from a memory and execute instructions to process data and to generate data or instructions to a second device. Such a second device may be another processor, a memory or a MEMS such as a focus mechanism. It was shown herein as an aspect of the present invention that a controller may determine a focus and/or a zoom setting of a camera and depending on this setting provide data to an image processor. The image processor is a processor that is enabled to process data related to an image. In general, instructions and processing of these instructions are arranged in an image processor in such a way that the complete processing of an image happens very fast, preferably in real-time. As processors are becoming much faster and increasingly having multiple cores, real-time processing of images as well as executing control instructions and retrieving and storing of data from and in a single or even multiple memories may be performed in a single chip, which may be called a single processor. Such a single processor may thus perform the tasks of a controller as well as an image processor. The terms controller and image processor may be interpreted as a distinction between functions that can be performed by the same processor. It is also to be understood that flows of instructions and data may be illustrative in nature. For instance, a controller may provide an image processor with the coordinates of a sensor area, which is rotated with respect to the axis system of the sensor. One may actually buffer data from a sensor area, defined by the coordinates, in a memory that represents a rectangular axis system. Different configurations of providing an image processor with the correct data are thus possible that lead to the image processor accessing the exact or nearly exact sensor are a data to exactly or nearly exactly stitch 2 or more images.

For reasons of simplicity, the parameters for camera settings have been so far limited to focus, zoom and position and related active sensor areas. Light conditions and shutter speed, as well as shutter aperture settings, may also be used. In fact, all parameters that play a role in creating a panoramic image may be stored in a memory and associated with a specific setting to be processed or controlled by a controller. Such parameters may for instance include transformational parameters that determine modifying pixels in one or more images to create a panoramic image. For instance, two images may form a panoramic image, but require pixel blending to adjust for mismatching exposure conditions. Two images may also be matched perfectly for a panoramic image, but are mismatched due to lens deformation. Such deformation may be adjusted by a spatial transformation of pixels in one or two images. A spatial transformation may be pre-determined in a calibration step, including which pixels have to be transformed in what way. This may be expressed as parameters referring to one or more pre-programmed transformations, which may also be stored in memory and associated with a reference setting.

The calibration methods provided herein allow an image processor to exactly or nearly exactly match on the pixel two or more images for stitching into a panoramic image. This allows skipping almost completely a search algorithm for registering images. Even if not a complete match is obtained immediately, a registering algorithm can be applied that only has to search a very small search area to find the best match of two images. The image processor may adjust pixel intensities after a match was determined or apply other known algorithms to hide a possible transition line between two stitches images. For instance, it may be determined during calibration that at a lens setting no perfect match between two images can be found due to distortion. One may determine the amount of distortion at the lens setting and have the image processor perform an image transformation that creates two registered images. The same approach applies if the uncertainty between two images is several pixel distances, for instance, due to deviations in driving mechanisms. One may instruct the image processor to for instance perform an interpolation. The parameters of the interpolation may be determined from predetermined pixel positions.

The adjustment of two or more images to create a single registered panoramic along for instance a merge line, may require a transformation of at least one image. It may also require blending of pixel intensities in a transition area. The processing steps for such transformation and or blending may be represented by a code and/or transformation and/or blending parameters. A code and/or parameters may be associated in a calibration step with a setting and conditions related to a reference lens and/or reference sensor unit and saved in a calibration memory which can be accessed by a controller. Thus, the controller will recognize a specific setting of a reference lens and retrieve the associated settings for the other lenses and sensors, including transformation and/or blending parameters and the sensor area upon which all operations have to be performed, including merging of sensor areas.

A controller may be a microcontroller such as a programmable microcontroller. These controllers that take input from external sources such as a sensor and drive a mechanism based on such input and/or previous states are known. Controllers that control aspects of a camera, such as focus, zoom, aperture and the like are also known. Such a controller is for instance disclosed in U.S. Pat. No. 7,259,792 issued on Aug. 21, 2007, and U.S. Pat. No. 6,727,941 issued on Apr. 27, 2004, which are both incorporated herein by reference in their entirety. Such a controller may also be known or be associated with a driving device. Such a driving device is for instance disclosed in U.S. Pat. No. 7,085,484 issued on Aug. 1, 2006, U.S. Pat. No. 5,680,649 issued on Oct. 21, 1997 and U.S. Pat. No. 7,365,789 issued on Apr. 29, 2008, which are all 3 incorporated herein by reference in their entirety.

In one embodiment of the present invention, all images are recorded at substantially the same time. In a second embodiment, at least two images may be taken at substantially not the same time.

In a further embodiment, a camera has 3 or more lenses, each lens being associated with an image sensor. Each lens may be a zoom lens. All lenses may be in a relatively fixed position in a camera body. In such a construction, a lens may focus, and it may zoom, however, it has in all other ways a fixed position in relation to a reference position of the camera. As an illustrative example, lenses are provided in a camera that may be aligned in one line. Such an arrangement is not a required limitation. Lenses may be arranged in any arrangement. For instance 3 lenses may be arranged in a triangle. Multiple lenses may also be arranged in a rectangle, a square, or an array, or a circle, or any arrangement that may provide a stitched image as desired. The calibration of lenses and sensor area may be performed in a similar way as described earlier. Each lens may have its own image sensor. One may also have two or more lenses share a sensor. By calibrating and storing data related to active image sensor areas related to a setting of at least one reference lens, which may include one or more merge lines between image areas of image sensors one may automatically stitch images into one stitched image.

The herein disclosed multi-lens cameras and stitching methods allow creating panoramic or stitched image cameras without expensive synchronization mechanisms to position lenses. The problem of lens coordination which may require expensive mechanisms and control has been changed to a coordination of electronic data generated by image sensors. The coordination of electronic image data has been greatly simplified by a simple calibration step which can be stored in a memory. The calibration data can be used by a controller, which can control focus, zoom and other settings. The memory also has the information on how to merge image data to create a stitched image.

In a further embodiment, one may provide one or more lenses with mechanisms that allow a lens and if required a corresponding image sensor to me moved in such a way that an optimal field of vision, or quality of image or any other criterion for a stitched image that can be achieved by moving lenses can be met.

In yet a further embodiment, one may have a set of lenses each related to an image sensor, a lens having a zoom capability. It is known that a higher zoom factor provides a narrower field of vision. Accordingly, two lenses that in unzoomed position provide a stitched panoramic image, may provide in zoomed position two non-overlapping images that thus cannot be used to form a stitched or panoramic image. In such an embodiment, one may have at least one extra lens positioned between a first and a second lens, wherein the extra lens will not contribute to an image in unzoomed position. However, such an extra lens and its corresponding image sensor, may contribute to a stitched image if a certain zoom factor would create a situation whereby the first and second lens can not create a desired stitched or panoramic image. As was explained before, the relevant merge lines or active areas of an image sensor will be calibrated against for instance a set zoom factor. When a certain zoom factor is reached, an image may be formed from images generated from the first, the second and the extra lens. All those settings can be calibrated and stored in a memory. One may include yet more extra lenses to address additional and stronger zoom factors.

Aspects of the present invention are applied to the creation of panoramic images using two or more sensor/lens units. There is also a need to create stereographic images using two sensor/lens systems. The aspects of the present invention as applied to two lenses for panoramic images may also be applied to create stereographic images.

Figure 22:
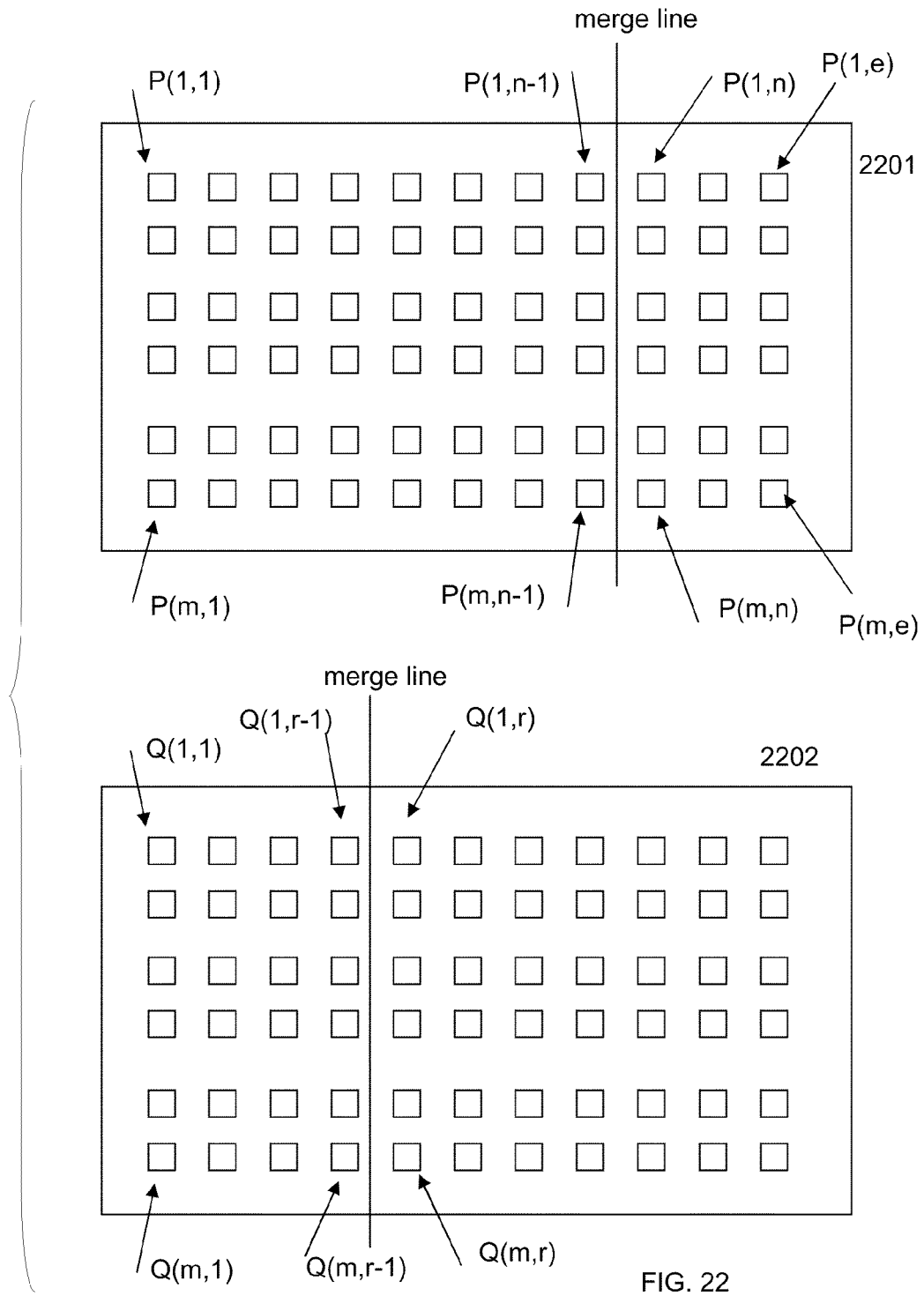
FIG. 22 illustrates the storing of image data generated by two sensors.

A further illustration of processing data of a limited area of an image sensor is provided in FIG. 22. Assume that an image has to be stitched from images generated by a sensor 2201 and a sensor 2202. For illustrative purposes, these sensors are pixel row aligned and are translated with respect to each other over a horizontal line. It should be clear that the sensors may also have a translation in vertical direction and may be rotated with respect to each other. For simplicity, reasons only one translation will be considered. Each sensor is determined by rows of sensor pixels which are represented in diagram by a little square. Each pixel in a sensor is assigned an address or location such as P(1,1) in 2201 in the upper left corner. A pixel P(x,y) represents how a pixel is represented as data for processing. What is called a sensor pixel may be sets of micro sensors able to detect for instance Red, Green or Blue light. Accordingly, what is called a sensor pixel is data that represents a pixel in an image that originates from a sensor area which may be assigned an address on a sensor or in a memory. A pixel may be represented by for instance an RGBA value.

A sensor may generate a W by H pixel image, for instance a 1600 by 1200 pixel image, of 1200 lines, each line having 1600 pixels. In FIG. 22 in 2201 the start of the lowest line at the lower left corner is then pixel P(1200,1). Assume that, during calibration, a stitched image can be formed from pixels along pixel line P(1, n−1) and P(m,n−1), whereby the merge line cuts off the data formed by area defined by P(1,n), P(1,e), P(m.n) and P(m,e) when the merge line is a straight line parallel to the edge of the sensor. However, other merge lines are possible. A second and similar sensor 2202 is used to provide the pixels of the image that has to be merged with the first image to form the stitched image. The sensor 2202 has pixel Q(x,y), which starting pixel at Q(1,1) and bottom pixel line starting at Q(m, 1) and the merge line running between Q(1,r−1) and Q(1,r) and Q(m,r−1) and Q(m,r).

One may process the data generated by the image sensors in different ways. One may store only the 'useful data' in a contiguous way in a memory. This means that the non-used data such as generated by area P(1,n), P(1,e), P(m,n) and P(m,e) and Q(1,1) Q(1,r−1), Q(m,r−1) and Q(m,1) is not stored. In a first embodiment, one may process the pixels to be stored for blending and transformation before storage. Accordingly, a stitched panoramic image will be stored in memory.

In a second embodiment, one may store data generated by the whole sensor area in a memory. However, one may instruct a memory reader to read only the required data from the memory for display. During reading one may process the data for blending and transformation and display only the read data which may have been processed, which will form a stitched image.

Fixed focus lens, digital zoom, barrel and pincushion distortion, keystoning. correction at capture and post-capture. Merge line, Fixed overlap at different positions of lens. Scaling effects to standard format.

It was shown above in one embodiment that one may include a focus mechanism such as autofocus in a camera to generate a panoramic image. In one embodiment one may have a focus mechanism associated with one lens also being associated with at least one other lens and potentially three or more lenses. This means that one focus mechanism drives the focus setting of at least two, or three or more lenses. One may also say that the focus setting of one lens drives all the other lenses. Or that all (except a first) lens are followers or in a master/slave relation to the focus of a first lens. Each lens has an image sensor. Each image sensor has an active sensor area from which generated data will be used. It may be that the sensor has a larger area than the active area that generates image data. However, the data outside the active area will not be used.

The data of the entire sensor may be stored, and only the data defined by the active area is used. One may also only store the data generated by the active area and not store the other image data of the remaining area outside the active area. One may illustrate this with FIG. 22. For instance an active area of an image sensor 2201 may be defined as the rectangular area defined by pixels P(1,1) P(1,n−1), P(m,n−1) and P(m, 1). In a first embodiment one may store all data generated by sensor area P(1,1), P(1,e), P(m,e) and P(m,1), wherein n, m and e may be positive integers with e>n. However, one may define the active area by for instance the addresses of a memory wherein only the data related to the active area is stored. Such an address may be a fixed address defining the corners and sides of the rectangle, provided with if required an off-set. The active sensor area is then defined by the addresses and range of addresses from which data should be read.

In a further embodiment on may also only store in a memory data generated by the active area. If areas are defined correctly then merging of the data should in essence be overlap free and create a stitched image. If one does not define the areas (or merge lines) correctly then one will see in merged data a strip (in the rectangular case) of overlap image content. For illustrative purposes rectangular areas are provided. It should be clear that any shape is permissible as long as the edges of images fit perfectly for seamless connection to create a stitched and registered image.

The active areas of image sensors herein are related to each lens with a lens setting, for instance during a calibration step. During operation a controller, based on the lens focus setting, will identify the related active areas and will make sure that only the data generated by the active areas related to a focus setting will be used to create a panoramic image. If the active areas are carefully selected, merged data will create a panoramic image without overlap. It should be clear that overlap data creates non-matching image edges or areas that destroy the panoramic effect. Essentially no significant image processing in finding overlap is required in the above approach, provided one sets the parameters for merging data appropriately.

In a further step one may apply fine tuning one may want in an optimization step of a range of a few pixels horizontally and vertically to establish or search for overlap. In a further embodiment optimization may be in a range of a shift of at most 10 pixels horizontally and/or vertically. In a further embodiment such an optimization step may be at most 50 pixels.

Such optimization may be required because of drift of settings. Such optimized settings may be maintained during a certain period, for instance during recording of images directly following optimization, or as long a recording session is lasting. One may also permanently update settings, and repeat such optimization at certain intervals.

Fixed Focus Lenses

In a further embodiment one may wish to use two or more lenses with a fixed focus. Fixed focus lenses are very inexpensive. In a fixed focus case the defined active areas of the sensors related to the lenses are also fixed. However, one has to determine during positioning of the lenses in the camera what the overlap is required to be and where the merge line is to be positioned. Very small lenses and lens assemblies are already available. The advantage of this is that lenses may be positioned very close to each other thus reducing or preventing parallax effects. A lens assembly may be created in different ways. For instance in a first embodiment one may create a fixed lens assembly with at least two lenses and related image sensors, the lenses being set in a fixed focus. One may determine an optimal position and angle of the lenses in such an assembly as shown in diagram in FIG. 23 for a set of two lenses. Three or more lenses are also possible. In 2301 and 2302 indicate the image sensors and 2303 and 2304 the related lenses of a 2 lens assembly.

Figure 23:
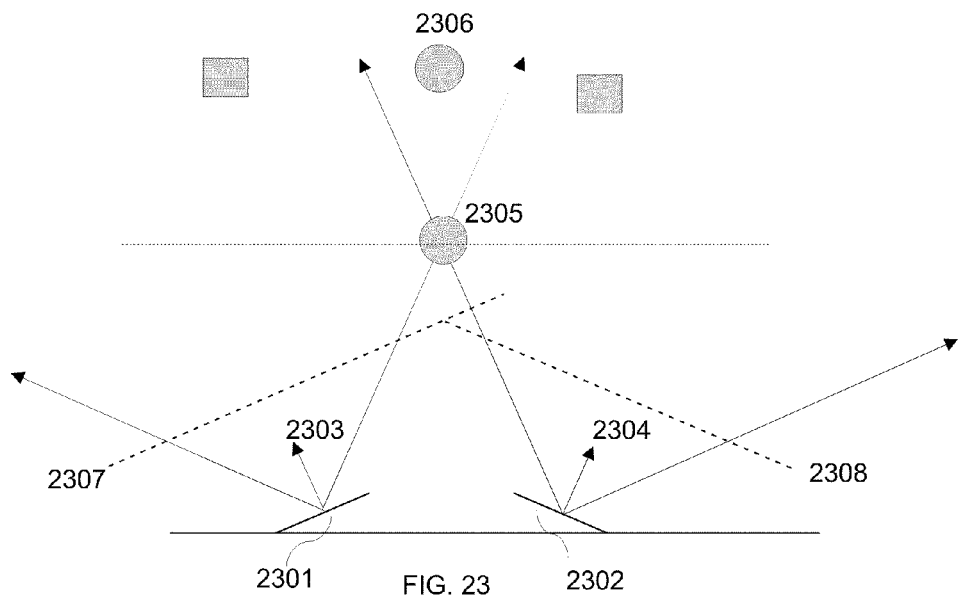
FIGS. 23-24 illustrate the capturing of images by two sensors.

Each lens in FIG. 23 has a certain field-of-view. Each lens is positioned (in a fixed position in this case) in relation to the other lens or lenses. Lines 2307 and 2308 indicate a minimum distance of an object to still be adequately recorded with the fixed focus lens. 2305 and 2306 indicate objects at a certain distance of the camera. One has to determine in a pre-manufacturing step, based on the quality of the lens, the fixed focus setting, the required overlap and the desired view of the panoramic image and other factors what the angle is under which the two (or in other cases 3 or more) lenses will be positioned. Once that is determined, a lens assembly will be manufactured with lenses under such an angle. For instance, one may create a molded housing that accepts individual lenses with there sensors in a certain position. One may create an assembly with two or more lenses that can be integrated in a camera such as a mobile phone. One may also create a camera housing that accepts the individual lenses in a certain position, or any other configuration that creates a substantially repeatable, mass production type of lens assembly.

Figure 24:
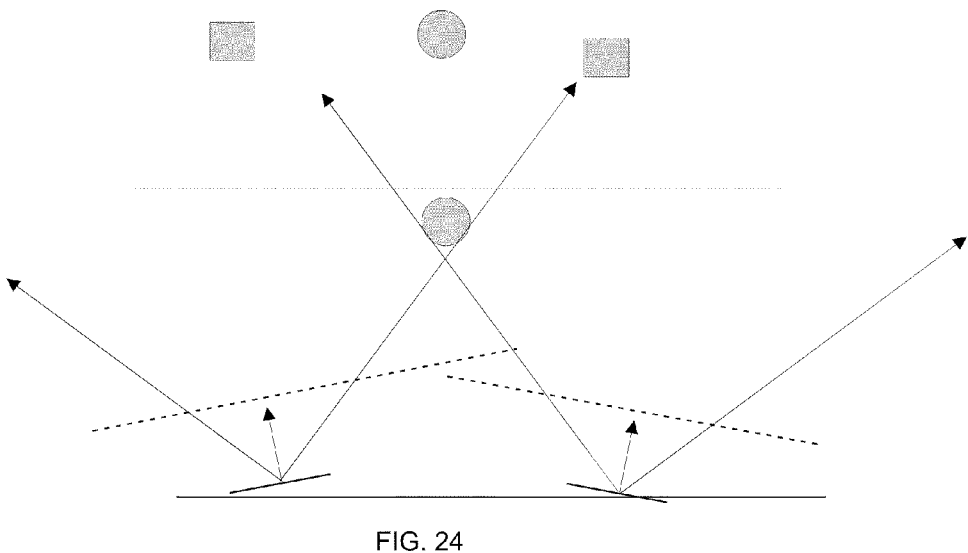

FIG. 24 demonstrates the effect of putting lenses under a different angle. Clearly, one has to decide based on different criteria, for instance how wide one wants to make the panoramic image and how close one wants an object to be in order to be put on an image. Quality of lenses may also play a role. Once the decision is made on the angle of the lenses, unless one installs mechanisms to rotate or move lenses, the angle and position of lenses are pretty much fixed. One can then make an assembly of lenses with lenses fixed to be put into a camera, or one may put 2 or more lenses in a fixture on a camera.

In both cases one most likely will have to calibrate the active sensor areas related to the fixed lenses. In a preferred embodiment the lenses will be put in an assembly or fixture with such precision that determination of active sensor areas only has to happen once. The coordinates determining an active area or the addresses in a memory wherefrom to read only active area image data may be stored in a memory, such as a ROM and can be used in any camera that has the specific lens assembly. While preferred, it is also an unlikely embodiment. Modern image sensors, even in relatively cheap cameras, usually have over 1 million pixels and probably over 3 million pixels. This means that a row of pixels in a sensor easily has at least 1000 pixels. This means that 1 degree in accuracy of positioning may mean an offset of 30 or more pixels. This may fall outside the accuracy of manufacturing of relatively cheap components.

It should be noted that while an image sensor may have 3 million pixels or more, that this resolution is meant for display on a large screen or being printed on high resolution photographic paper. A small display in a relatively inexpensive (or even expensive) camera may have no more than 60.000 pixels. This means that for display alone a preset active area may be used in a repeatable manner. One would have to downsample the data generated by the active image sensor area to be displayed. There are several known ways to do that. Assuming that one also stores the high resolution data one may for instance selectively read the high resolution data by for instance skipping ranges of pixels during reading. One may also average blocks of pixels whereby a block of averages pixels forms a new to be displayed pixel in a more involved approach. Other downsample techniques are known and can be applied.

In a further embodiment one creates an assembly of lenses and associates a specific assembly with a memory, such as a non-erasable, or semi-erasable or any other memory to store coordinates or data not being image data that determines the image data associated with an active area of an image sensor. One does this for at least two image sensors in a lens assembly, in such a way that an image created from combined data generated by active image sensor areas will create a registered panoramic image.

Figure 25:
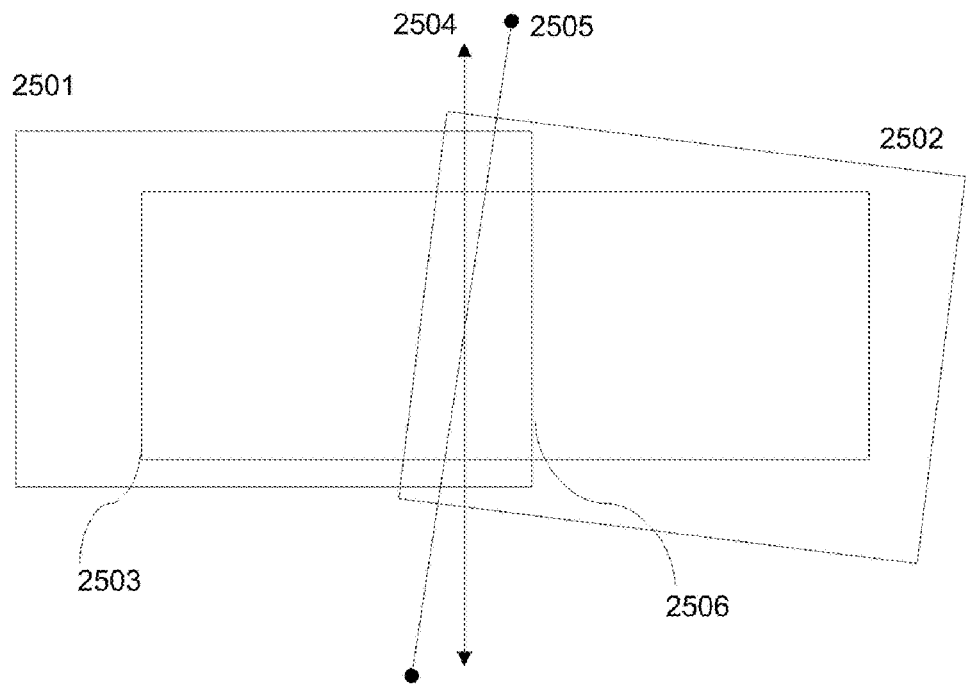
FIG. 25 illustrates two images captured by two sensors.

This is illustrated in diagram in FIG. 25. Two image sensors 2501 and 2502 show images with overlap. It is to be understood that this concerns images. The sensors themselves do of course not overlap. It is to be understood that the image sensors are shown with a relative angle that is exaggerated. One should be able to position the sensors/lenses in such a way that the angle is less than 5 degrees or even less than 1 degree. Assume that one wants to create an image 2403 formed by combining data of active areas of the sensors. The example is limited to finding a vertical or almost vertical merge line and lines 2504 and 2505 are shown. Many more different vertical merge lines are possible. For instance, in an extreme example one may take the edge 2506 of image sensor 2501 as a merge line. For different reasons extreme merge lines may not be preferred.

Figure 26:
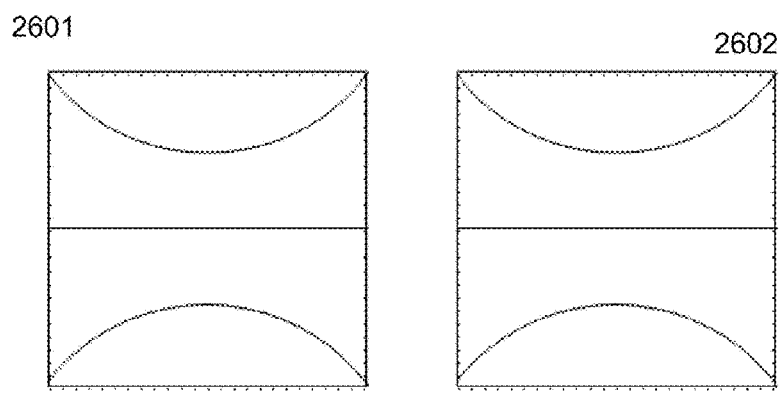
FIGS. 26-28 illustrate image distortion.
Figure 27:
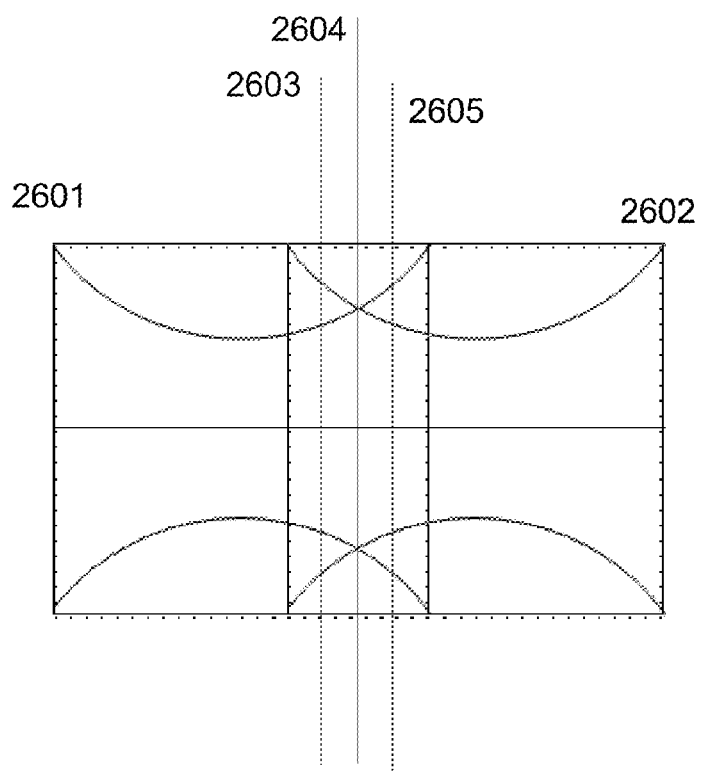
Figure 28:
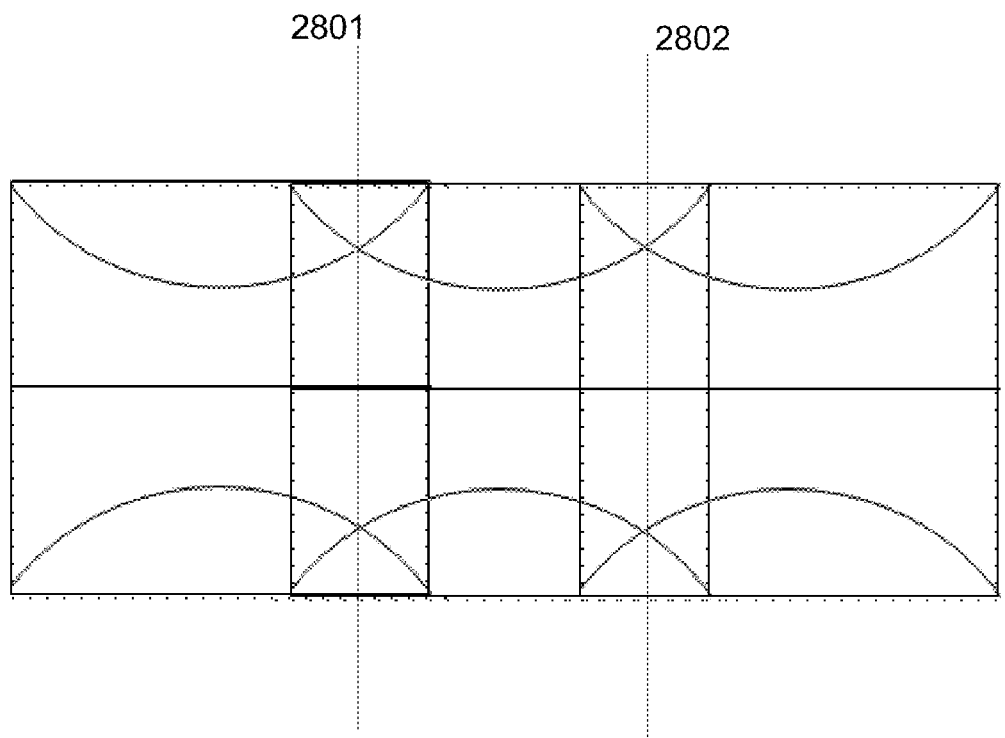

It is known that lenses will not generate a geometrical rectangular image with all in reality parallel lines being parallel in the image from a lens. In fact many lines will appear to be curved or slanted. For instance, lenses are known to have barrel distortion which is illustrated in FIG. 26. It shows curvature in an image from a sensor 2601 and 2602. Lens distortion such as barrel distortion and pincushion distortion is generally worse the more removed from the center of the lens. FIG. 27 shows a merged image from image sensors 2601 and 2602. Clearly, when there is more overlap there is less distortion. It is also important to position the merge line in the correct position. This is illustrated with merge lines 2603, 2604 and 2605. It shows directly a disadvantage of creating a panoramic image from only two lenses. The center of such image, which will draw the most attention, is actually formed from the parts of the individual images with the most distortion. FIG. 28 shows a registered panoramic image formed from at least 3 sensors/lenses with merge lines 2801 and 2802. The center of the image will be relatively distortion free.

It is thus clear that in one embodiment one should determine in a calibration step in a fixed lens assembly the active sensor areas to form a panoramic image and store data that determines image data from the active sensor area in a memory such as a ROM that is part of the camera that will generate the panoramic image.

Figure 29:
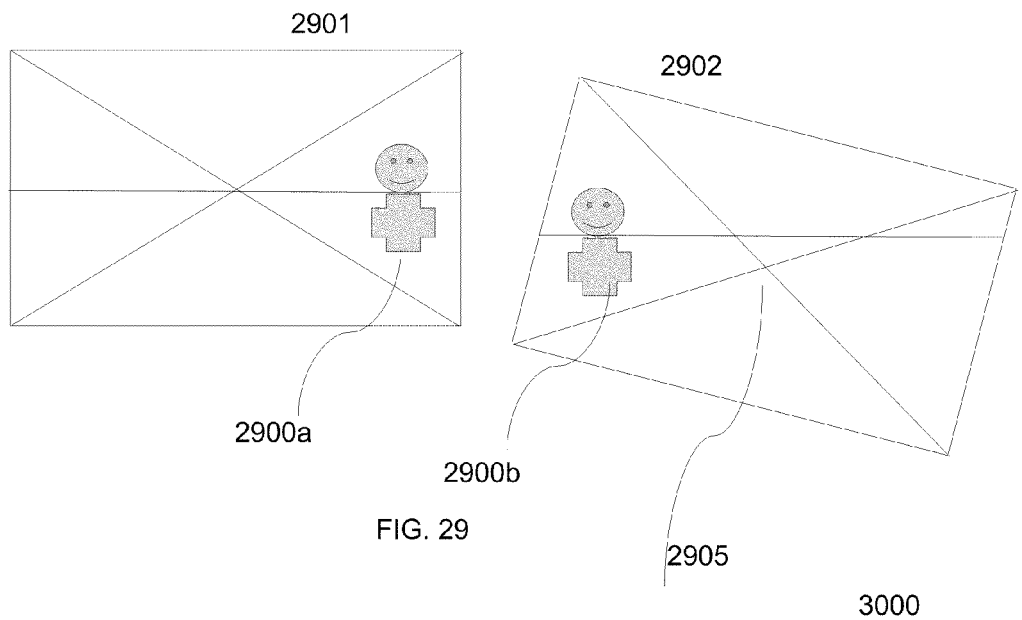
FIGS. 29-34 illustrate image displays in accordance with one or more aspects of the present invention.
Figure 30:
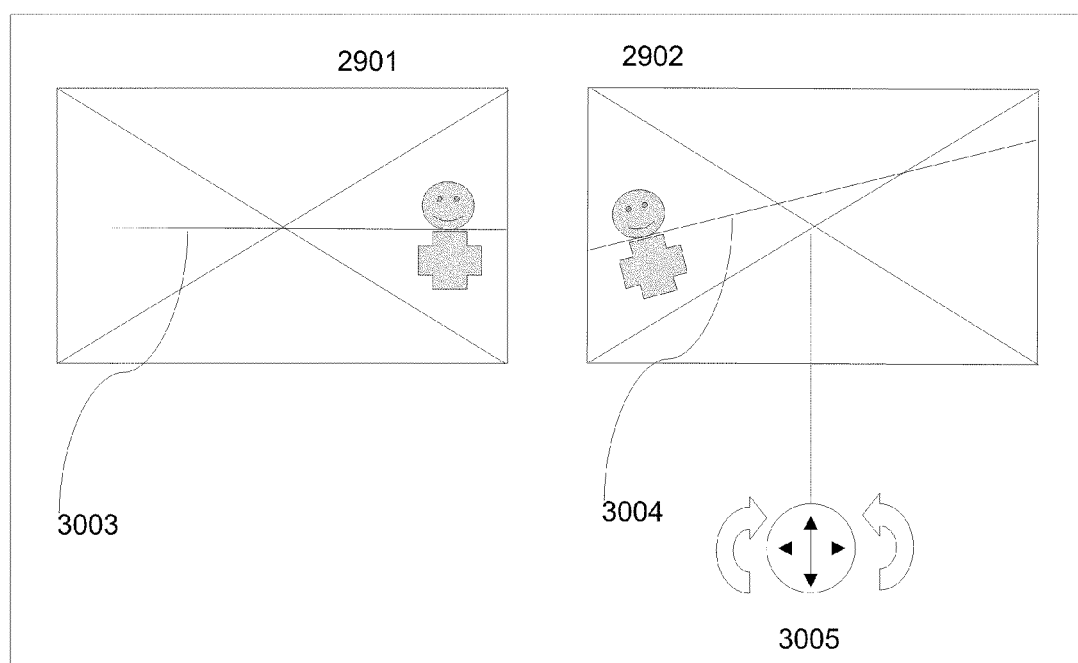
Figure 31:
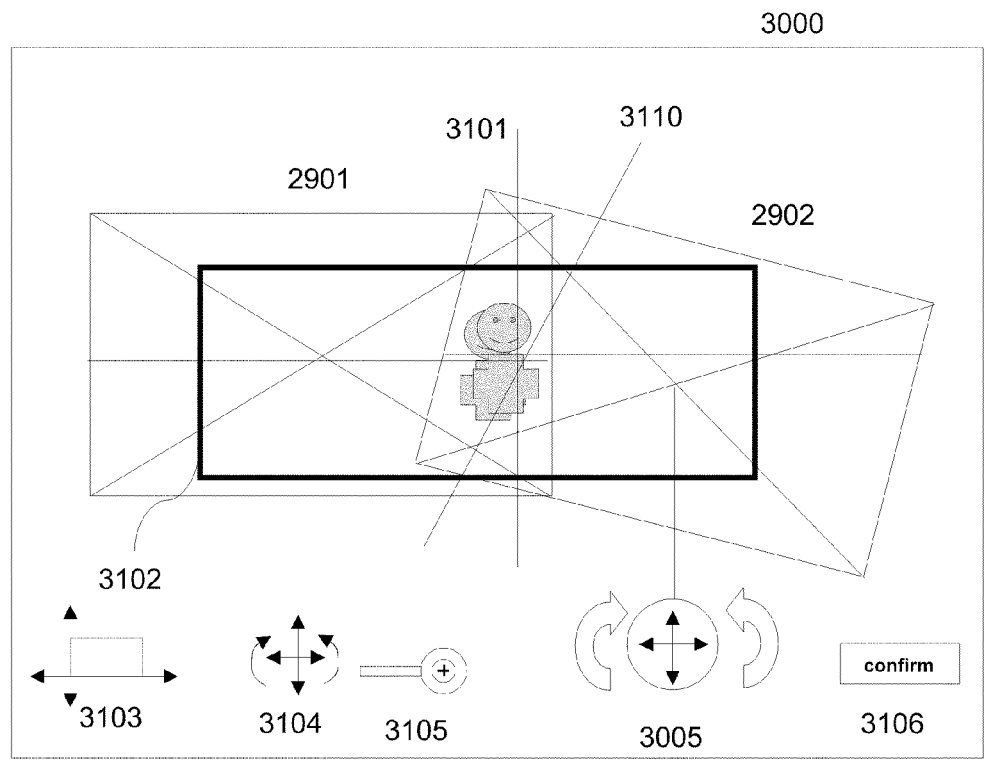

The steps to find such active areas and to set and align these areas in image sensors are not trivial steps. It has to be done with optimal precision at the right time and the result has to be stored appropriately as data and used by a processor and memory to appropriately combine image data from the active areas to create a registered panoramic image. Because most image parameters of the images are pre-determined one does not have to deal with the common difficulties of creating a registered image by finding appropriate overlap and aligning the individual images to create a common registered image. The steps are illustrated in FIGS. 29-31. Assume in an illustrative example in FIG. 29 a lens assembly of at least two lenses which is able to generate at least two images of a scene by two image sensors 2901 and 2902. The position and orientation of the sensors is exaggerated for demonstration purposes. One should realize that in essence there are two related images that have to be combined. Both sensors generate an image of the same object which is image 2900a by sensor 2901 and image 2900b by sensor 2902. The intent is to define an active area in sensor 2901 and in 2902 so that image data generated by those active areas both have overlap on the images 2900a and 2900b and that combining image data from the active areas will generate a registered image.

To further show the difficulties of determining active areas of image sensors, sensor 2902 has been provided with a rotation related to the horizon if 2901 is aligned with the horizon. Sensor 2902 also in the example has a vertical translation compared to 2901. Sensors 2901 and 2902 of course have a horizontal translation compared to each other. These will all be addressed. It should also be clear that the sensors may have distortion based on other 3D geometric location properties of the sensors. For instance one may imagine that 2901 and 2902 are placed on the outside of a first and second cylinder. These and other distortions including lens distortions may be adequately corrected by known software solutions implemented on processors that can either process photographic images in very short times or that can process and correct video images in real time. For instance Fujitsu® and STMicroelectronics® provide image processors that can process video images at a rate of at least 12 frames per second.

FIG. 30 shows a display 3000 that can display the images as generated by 2901 and 2902 during a calibration step. Such a display may be part of a computer system that has two or more inputs to receive on each input the image data as generated by an image sensor. A computer program can be applied to process the images as generated by the sensors. In a first step the two images from 2901 and 2903 are displayed. Both sensors may be rectangular in shape and provide an n pixel by m pixel image. For instance a sensor may be a CCD or CMOS sensor that represents a 4:3 aspect ration in a 1600 by 1200 pixel sensor with a total of 1.92 megapixels and may have a dimension of 2.00 by 1.5 mm. It is pointed out that there is a wide range of sensors available with different sizes and pixel densities. The example provided herein is for illustrated purposes only.

The first striking effect is that the image of sensor 2902 in FIG. 30 on display 3000 appears to be rotated. One is reminded that the sensor was originally rotated. It is assumed that sensors pixels are read and stored as rectangular arrays, wherein each pixel can be identified by its location (line and column coordinate) and a value (for instance a RGB intensity value). It is assumed that pixels are displayed in a progressive horizontal scan line by line. Though other known scanning methods such as interlaced scanning are also contemplated. This means that the pixels as generated by sensor 2902 will be read and displayed in a progressive scan line by line and thus will be shown as a rectangle, of which the content appeared to be rotated.

The computer is provided with a program that can perform a set of image processing instructions either automatically or with human intervention. The images thereto are provided in a calibration scene with landmarks or objects that can be used to align the images of 2901 and 2902. One landmark is a horizon or background that defines an image line which will appear as 3003 in 2901 and as 3004 in 2902 and can be used for rotational and vertical translation alignment of the two images. The calibration scene also contains at least one object that appears as 2900a in 2901 and as 2900b in 2902 and can be used to fine tune the alignment. One may use the image of 2901 as the reference image and translate and rotate the image of 2902 to align. A computer program may automatically rotate the image of 2902 for instance around center of gravity 2905 to align 3003 with 3004 or make them at least parallel. Two-dimensional image rotation even in real time is well known. For instance U.S. Pat. No. 6,801,674 to Turney and issued on Oct. 5, 2004 and which is incorporated by reference in its entirety discloses real-time image rotation of images. It is also noted that on for instance a camera phone a display has a much lower resolution than the resolution capabilities of a sensor. Accordingly, while the shown rotational of 30 degrees or larger misalignment may noticeable even at low resolutions, a misalignment lower than 0.5 degrees or 0.25 degrees which falls within rotational alignment manufacturing capabilities of the lens/sensor assembly unit may not be noticeable on a low resolution display and may not require computational potentially time consuming activities such as resampling. Accordingly, rotational alignment of 2 or more still images and video images in a calibration situation is fully enabled.

In a next step the image of 2902 may be vertically translated so that 3003 and 3004 become completely aligned. These steps may be performed automatically as known in the art of image registration or manually. For manual alignment a user interface with icon 3005 may be provided on the display, wherein the user interface provided by the icon controls instructions on the computer as is known in the art of user interfaces. Clicking on the ends of the arrows in interface icon 3005 may move the image of 2902 either up, down, left, right, or clockwise turn or counter-clockwise turn the image related to its center of gravity. Other points of transformation are possible and are contemplated.

FIG. 31 shows display 3000 with the images of 2901 and 2902 at least rotationally aligned. Additional user interface icons are also shown. Clicking on interface icon 3103 makes panoramic image frame 3102 appear. Image frame 3102 is the frame of the panoramic image as it appears on a display of the panoramic camera assembly with a display. It thus determines the size of the final image. One may click on the arrow heads of interface 3103 icon to translate the panoramic frame horizontally and vertically. One can clearly see that the images of 2901 and 2902 are not yet vertically and horizontally aligned. One may have the computer align the images by using known stitching or alignment software. One may also use the interface icon 3005 as described above to manually align or to fine tune an automatic alignment. One may thereto use the user interface with icon 3105 to zoom in on a specific part of the image up to pixel level. One may then zoom out again after satisfactory alignment.

One may use the display 3000 in one of at least two modes. The first mode is the transparent mode and the second is the opaque mode. In the transparent mode both images generated by 2901 and 2902 are shown at the same time, also in the overlap region. The computer may determine an overlap region in display and reduce the intensity of the displayed pixels in overlap so the display does not become saturated. In this mode one may find a position of good alignment. A user interface icon 3104 controls a program related to a merge line 3101. Clicking on the icon provides a cursor on the combined image in the form. One may drag said cursor to a selected place and two actions take place: a merge line 3101 appears and the images go into opaque mode wherein there is one opaque image area left of the merge line 3101 and another opaque merge area to the right of the merge line. The combined opaque messages now show the registered image. One may move the merge line, or rotate it as shown as 3110 by clicking for instance on the arrow heads of interface icon 3104. One may make the tool inactive when the merge line 3101 at any stage does not include sensor image area of 2901 and 2902 within frame 3102. The moving of the merge line allows searching for overlap areas that provide for instance the least amount of distortion.

Figure 32:
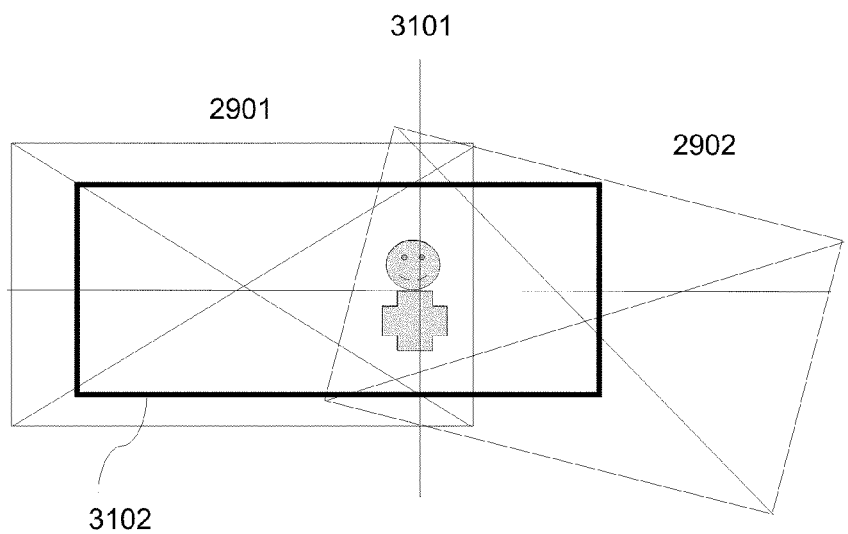
Figure 33:
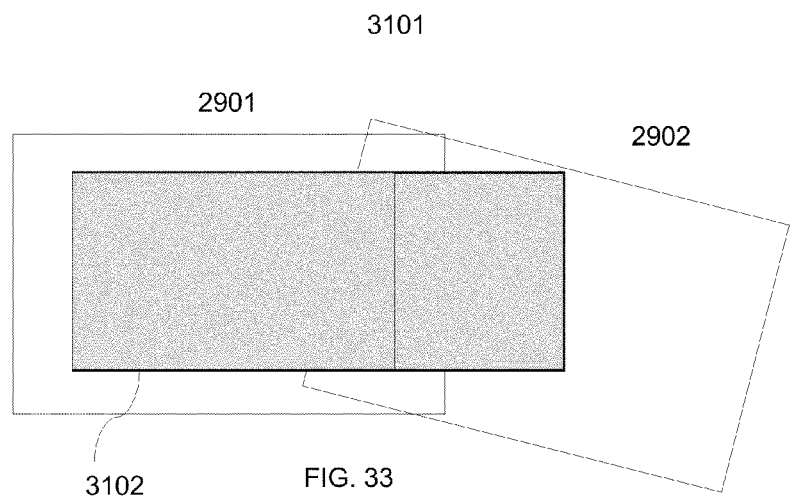

Once one is satisfied with the resulting display result of the panoramic registered image as for instance shown in FIG. 32 one may fix the result by activating interface icon 3106. FIG. 33 shows that the active areas are fixed. The computer program may determine and store the coordinates of the corners of the respective active areas relative to for instance the corner coordinates of the sensor arrays 2901 and 2902 in a memory. Assume that 2901 and 2902 are both 1600 by 1200 pixel arrays, with corner coordinates (0,0), (0,1600), (1200,0) and (1200,1600). Sensor 2901 is the reference, and the active area has corner coordinates (x11,y11), (x11,y12), (x21,y11), (x21, y12). Sensor 2902 is regarded as the rotated one. The relevant coordinates for the active area are (x21,y21), (x22,y22), (x23, y23) and (x24,y24). This is shown in diagram in FIG. 34. When there is significant rotation in 2902 compared to 2901 one has to cut image 3402 associated with the active area of 2902 out of the image and rotate (including resampling if required) the cutout to create a rectangular image which can be combined with the image 3401 generated by the active area of 2901 so that both images may be combined into a registered panoramic image. One way to combine the data is to create scanlines formed by combining corresponding lines of image 3401 and rotated image 3402 into a single line which then forms a scanline for the registered panoramic image.

One may form a scanline by for instance scanning data of line 1 of image 3401 and line 1 of rotated image 3402 to a display. In such a case the registered panoramic image is formed on the display. One may also combine the corresponding scanlines of 3401 and 3402 to be stored as data representing combined scanlines. In such an embodiment the registered panoramic image exist as data of a complete image and may be processed as such, for instance for image segmentation.

Figure 35:
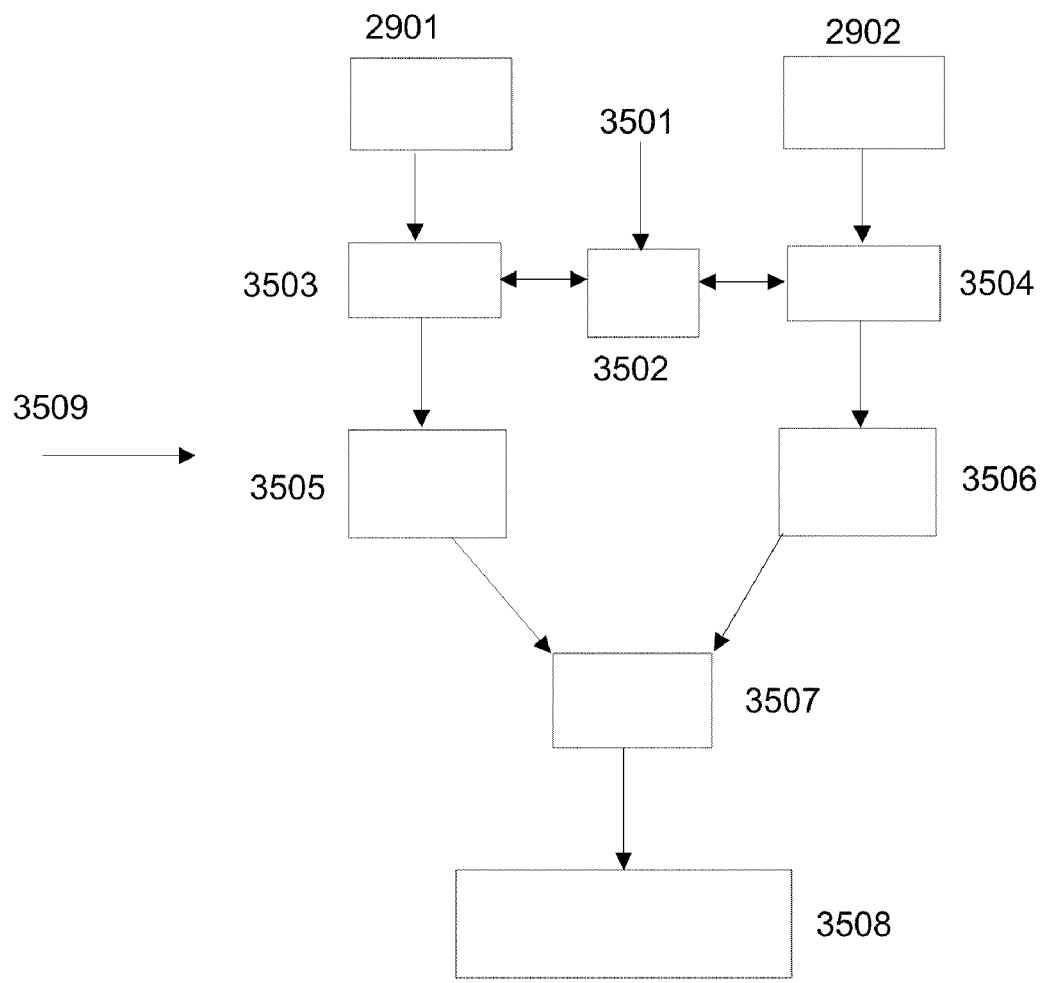
FIG. 35 is a diagram of a system in accordance with an aspect of the present invention.

FIG. 35 shows in diagram one embodiment of creating a display displaying a registered panoramic image from an assembly of at least 2 lens/image sensor units. It should be clear that one may apply the above also to an assembly of 3 or more lens/sensor units. For three such units if one aligns those in one line, it is preferred to apply the middle unit as the reference unit and use the outside units to determine rotation. FIG. 35 illustrates 2 lens/sensor units with sensors 2901 and 2902. During a calibration step as described above generates data determining coordinates of active areas. That data is provided on an input 3501 to be stored in a device 3502 which comprises at least memory and may include a processor.

During operation of the lens/sensor assembly image data from 2901 is provided to a processor 3503 and image data from sensor 2902 is provided to a processor 3504. Processors 3503 and 3504 may also be one processor which is operated in time share mode. Processors 3503 and 3504 are provided by 3502 with data or instruction which part of the data generated by the sensors is to be considered active area image data. Before processing image data, the image data as generated by the sensors may be temporarily or long term stored in a buffer or memory before being sent to their respective processors.

The processed image data, now representing only active area image data, of which the data of 2902 is rotated if required may be stored in memory or buffers 3505 and 3506. The data in these buffers may be combined and further processed by a processor 3507 to be displayed as a registered panoramic image on a display 3508. It is to be understood that one may further store at each stage in a memory or buffer the processed data, preferably as a complete frame of an image.

The system as shown in FIG. 35 may work under a clock signal provided on 3509.

Figure 34:
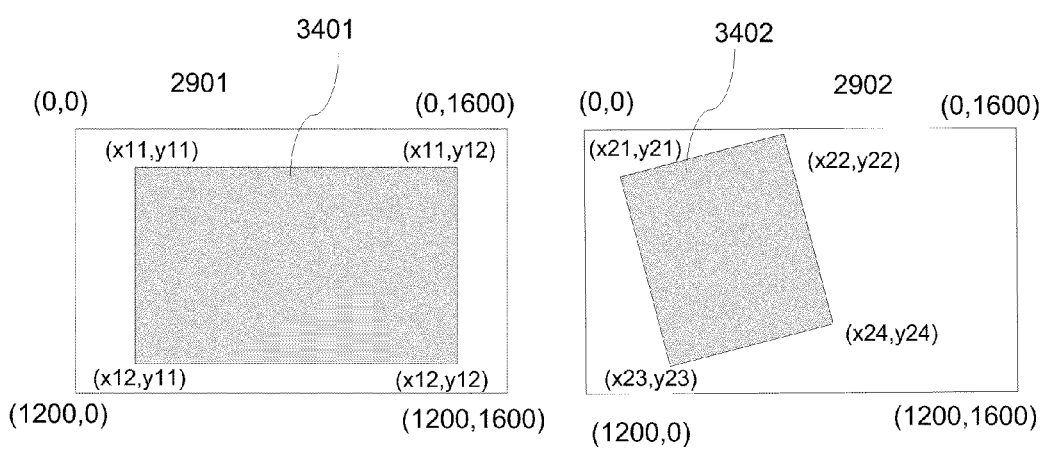

It is pointed out that in the example as shown in FIG. 34 the selected active sensor areas are rectangular. This is not required as one may rotate the merge line. Some of the illustrative examples are provided for a lens/sensor assembly of 2 lenses and for 3 or more lenses wherein the lenses each have an identical and fixed focal length. This enables a relatively inexpensive multi-lens camera that can generate a good quality registered panoramic image in a point-and-click manner, which is enabled by a simple calibration process of which the results can be beneficially re-used during operation. It should be clear that one may combine the details of the calibration method and apparatus of the fixed focal length lens with the earlier provided methods and apparatus of the variable focal length setting using a focus mechanism as also described herein.

The method and apparatus as provided herein allows for generation of registered panoramic images which may be still images or video images on a display. The display may be a small size display on the camera with a much smaller number of pixels than generated by the sensors. It was already shown that one may downsample the image for display. In a further embodiment the data represented the complete high pixel count panoramic images as generated by the camera may be provided on an output to the outside world. The image data may be stored or processed to generate images that may be displayed on a high pixel density display, or on a larger display with either low or high pixel density or it may be printed on photographic paper. Sharing of images depends heavily on standards and standard formats. The most popular image format is the relative 4:3 aspect ratio. Many displays have such an aspect ratio. Other display ratios are also possible. One may resize images to fit a standard 4:3 aspect ratio to other aspect ratios. In general that may lead to loss of image area or to the occurrence of non-image areas such as the known letter-box format in video display of wide-screen videos. By nature of the panoramic image with a limited number of sensors one tends to create an image which has the same height as a standard image but is stitched with other images to provide a broader view, and perhaps not a higher view. One may create a "higher view angle" as shown in FIG. 5 by adding lens/sensor not only in one dimension but also in a second dimension.

Figure 36:
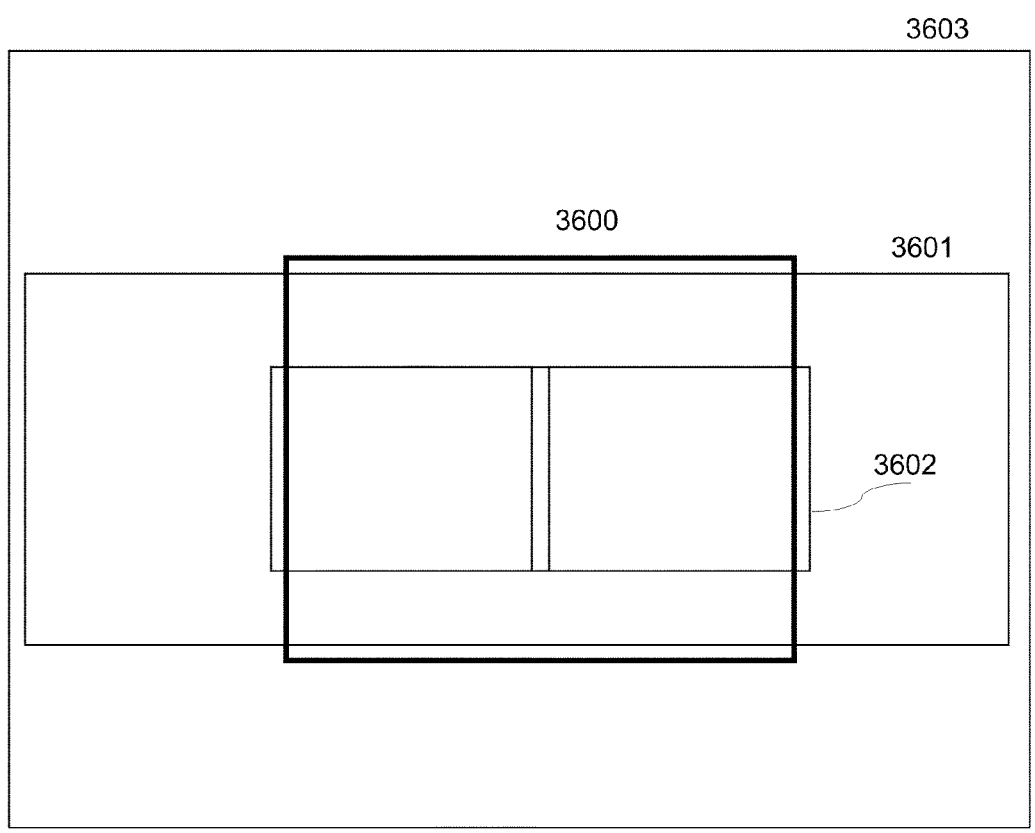
FIG. 36 illustrates resizing of an image in accordance with an aspect of the present invention.

It is contemplated that while a camera may have the capabilities to record, create, display and output wide view registered panoramic images a user may desire to share images taken in panoramic mode with a device (such as a camera phone of another user) that does not have panoramic image display capabilities. The user of a panoramic camera may want to be able to select the format in which he transmits a panoramic image. This is illustrated in FIG. 36. The blocks 3600, 3601, 3602 and 3603 represent relative image sizes. The block 3600 represents the standard 4:3 aspect ratio image size. Block 3601 represents a registered panoramic image which fits substantially the display on the camera. If one prefers to send an image that substantially fits a 4:3 aspect ratio display or photograph one may send an image determined by the pixels inside 3600. Clearly, image data will be lost. But the image that fits 3600 may not need resampling and may be able to be displayed directly on a standard 4:3 display or photograph. One may also resize a panoramic image 3601 in a size 3602, which may require resampling. However, such a resized image can be directly displayed on a 4:3 display with non-image banding. In a further embodiment one may create a registered panoramic image 3603 based on registered vertical image data. One may still display such an image on a display with a size conforming with 3601, thus losing image size. However, it is also fairly easy to resize image 3603 into 3600 to be displayed on a standard 4:3 image display. One may implement the resizing methods on the camera and provide a user with a user interface option to select the preferred resizing or maintain the generated panoramic image size in an embodiment of the present invention.

The Balance Between Mechanical and Computational Cost

It was shown above how one can create a registered panoramic image in a multiple lens/sensor assembly by applying first a calibration step associating active image sensor area with to be merged image data. This ensures that a stored setting can be used rather than determining such a setting each time a panoramic image has to be generated. This by itself may significantly reduce the computational cost and time in generating a panoramic image. It is believed that the cost of processing and of image sensing will go down and the speed of processing will increase, while the cost of labor and mechanical devices will remain relatively high. Many different configurations and embodiments to implement methods and apparatus provided herein are contemplated and the herein provided embodiments are provided as illustrative examples. A preferred embodiment is one that provides an acceptable quality registered panoramic image in the fastest way and a panoramic video image in real-time at the lowest cost. For instance one may use known homography such as disclosed for instance in U.S. Pat. No. 7,460,730 to Pal et al. issued on Dec. 2, 2008 which is incorporated herein by reference implemented on a very high-end video processor to generate real-time HD panoramic video. Presently, requirements like that would prevent a camera phone with panoramic image capabilities from becoming a mass-produced article. This section is focused on embodiments that would further enable certain aspects of the present invention at a price, effort and quality.

One may provide additional features and improvements of the quality of the generated panoramic image in yet additional embodiment.

One issue to be addressed is the rotational alignment of at least two images generated by two image sensors. The screenshot in diagram of FIG. 31 illustrates rotational alignment by way of a processor. Rotational alignment may require, depending on the image size, pixel density and angle of rotation a significant amount of processing. A very small rotation may be virtually undistinguishable on a small display, so no adjustment may be required. However, a full display of not rotationally aligned images even at a small angle of less than for instance 0.5 degrees may be clearly visible on a high definition full display. A small rotational angle may only require a reading of pixels under such angle and may not require resampling of the rotated image. A rotation of almost 30 degrees as used in the illustrative example of FIG. 31 is clearly not realistic and completely preventable if so desired. It should be clear that rotational alignment is a more involved process than translational alignment. Translational alignment is essentially an offset in horizontal and/or vertical memory address of a stored image and is easy to implement.

Rotational alignment is more difficult because of the mapping of an image created from sensor elements in one rectangular array into pixels in a rotated rectangular display array. A sensor array provides consecutive or interlaced scan lines of pixel signals which is essentially a series of sampled signals which are provided to an Analog/Digital converter which may temporarily be stored in a buffer as raw data. The raw data is processed by a processor for a process that is known as de-mosaicing. Pixels in for instance a CMOS sensor are comprised of several components that have to be processed to create a smooth image. The raw data if not processed may also show artifacts such as aliasing, which affects the quality of an image. By processing steps, which may include smoothing, filtering, interpolation and other known steps the raw image data is processed into displayable image data which may be displayed on a display or printed on photographic paper. De-mosaicing is well known and is described for instance in U.S. Pat. No. 6,625,305 to Keren, issued on Sep. 23, 2003, which is incorporated herein by reference. One may at the time of de-mosaicing also resize the image so that the reference image and the to be rotated image have the same size at their merge line. De-mosaicing and resizing of raw data is described in U.S. Pat. No. 6,989,862 to Baharav et al. and issued on Jan. 24, 2006 which is incorporated herein by reference.

The problem related to rotated images is that the de-mosaicing is performed with relation to certain rectangular axis determined by the axis of display. Rotating a de-mosaiced image means a further processing of already processed display pixels. This may lead to a deterioration of the rotated image. One may for instance perform with an image processing application rotation over an angle of an image for instance in JPEG format and derotate the rotated image over the exact angle. One may in general notice a deterioration of the final image. It would thus be beneficial to rotate the image using the raw data and use the rotated raw data as the rectangular reference system for demosaicing and display. This also means that no relative expensive and/or time consuming image rotation of demosaiced image data has to be applied.

Image rotation of raw image data can be achieved by storing the raw data along rotated scan lines, but storing the data in a rectangular reference frame. In general using raw data along rotated scanlines will create image distortion. This is because a scanline along for instance 30 degrees will capture the same number of pixels but over a longer distance. This effect is negligible over small angles of 1 degree or less. For instance the sine and tangent of 1 degree are both 0.0175. That means that over a long side of a thousand pixels a short side at 1 degree has about 17 pixels without significant increase of the length of the scanline. Such an increase is less than one pixel and thus has negligible distortion.

Figure 39:
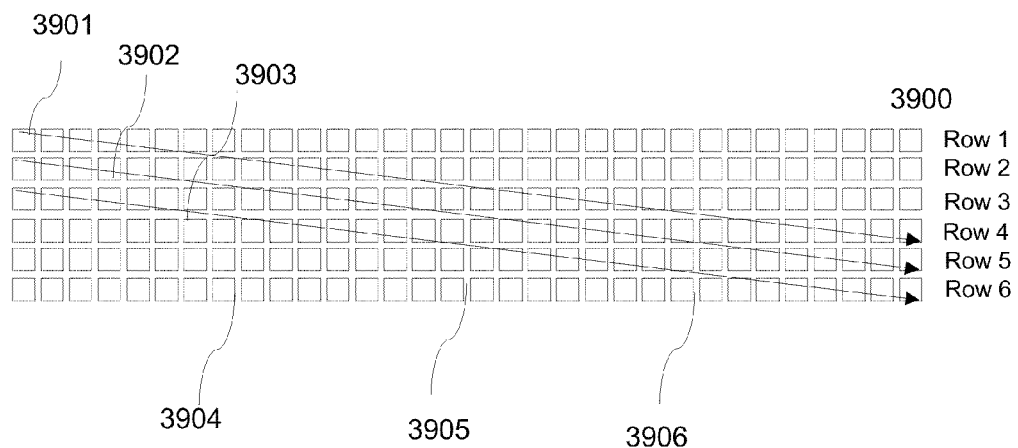

This scanning along rotated scanlines is illustrated in FIG. 39. One should keep in mind that the diagram of FIG. 39 is exaggerated and that the actual scanlines of the sensor will be under an angle that can be much smaller. Also the number of pixels in a line will be much larger, often 1000 or more pixels per line. In FIG. 39 3900 is the sensors with rectangular arranged sensors elements in Rows 1-6. It is to be understood that a real sensor has millions of pixels. The new scanlines, rather than along the horizontal lines will be along parallel scanlines 39-1, 3902, 3903 and so on. There are different ways to define a scanline. In this example a scanline crosses 4 parallel horizontal pixel lines of the sensor. A horizontal line has 32 pixels. One scanline scheme would be for the first rotated scanline: use 8 pixels from the beginning of the horizontal line Row 1 where the scanline begins. At point 3904 use the 8 pixels of the next horizontal line Row 2 as pixels of the scanline; at point 3905 use the 8 pixels of the next horizontal line Row 3 as pixels of the scanline; and at point 3906 use the 8 pixels of the next horizontal line Row 4 as pixels of the scanline. As a next step use Row 5 as the beginning of the new rotated scanline, and use the previous steps with of course all horizontal rows moved one position. One can easily see how this also creates scanlines 3902 and 3903 and additional scanlines. One may define the starting points of the scanlines to create the appropriate merge line to merge the reference image and the rotated image.

Figure 37:
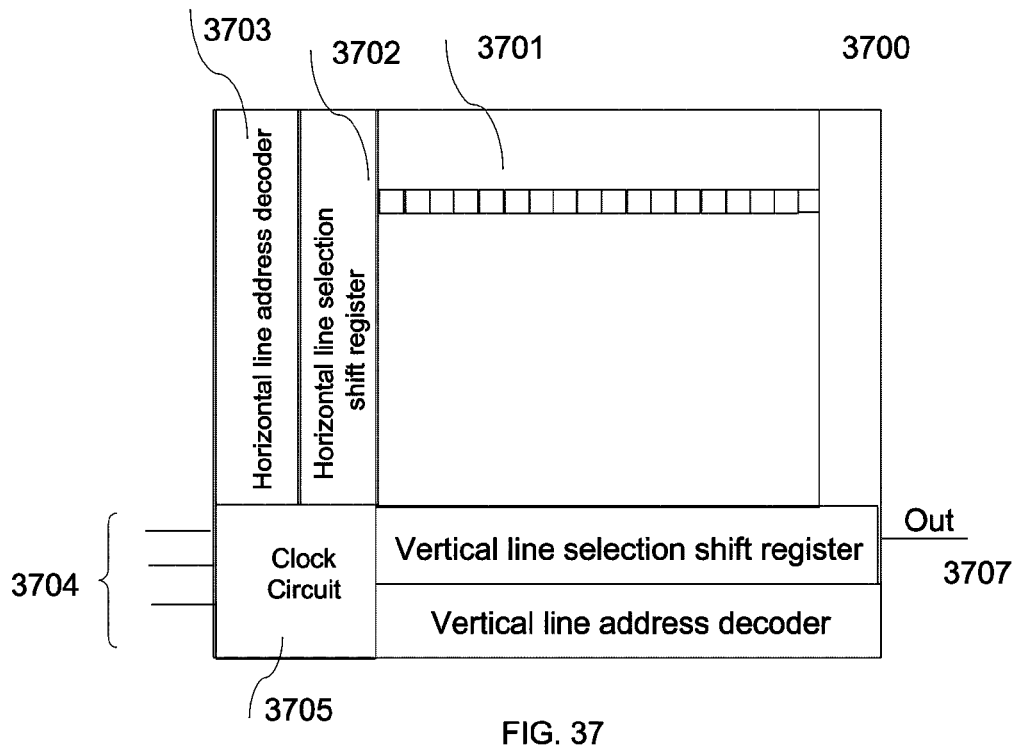
FIGS. 37-40 illustrate scanlines related to a sensor.
Figure 38:
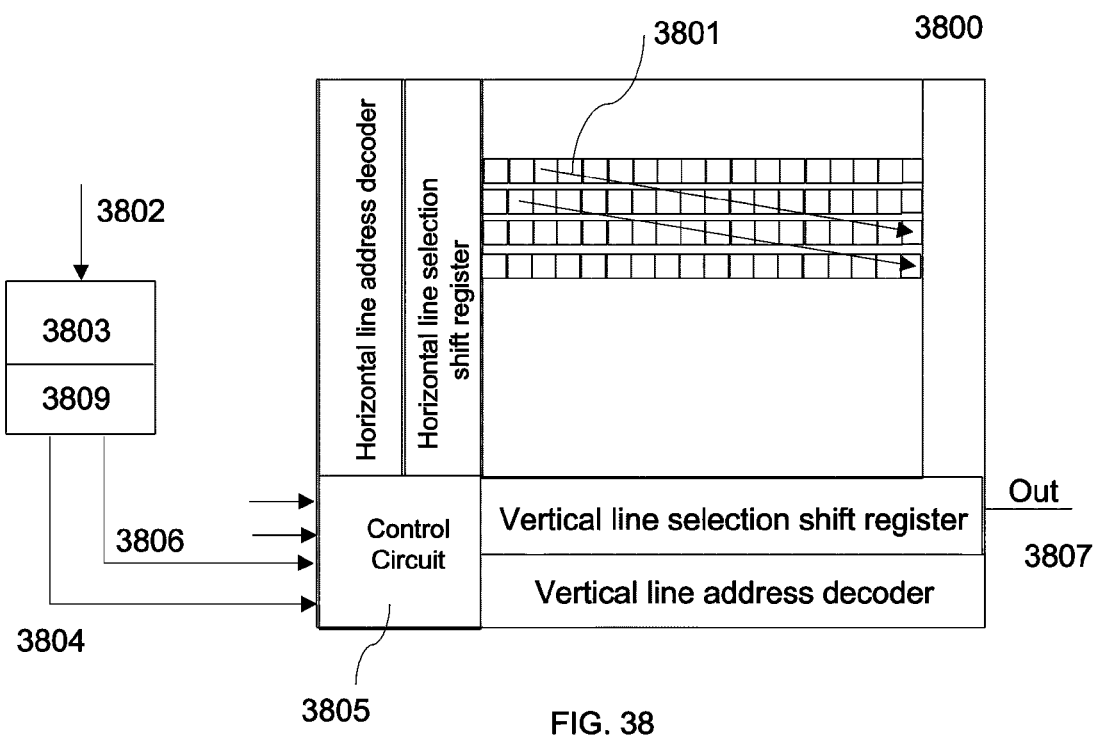

How to implement the rotated scanlines is further illustrated in FIGS. 37 and 38. FIG. 37 illustrates a known addressing method and apparatus for reading an image sensor. It is for instance described in U.S. Pat. No. 6,900,837 to Muramatsu et al. issued on May 31, 2005, which is incorporate herein by reference. FIG. 37 is equivalent to FIG. 2 in Muramatsu. It shows a sensor 3700 with identified a row of sensor elements 3701. Though each pixel is shown as 1 block it may contain the standard square of 2 green elements, a red element and a blue element. It may also contain layers of photosensitive elements, or any other structure of known photosensitive elements. The sensor can be read by activating a horizontal address decoder (for the lines) and a vertical address decoder for the vertical lines. In general the decoder may provide a signal to the horizontal line selection shift register, which will activate the line to be read. Once a line is activated a series of signals will generate a series of consecutive vertical addresses which allows activation by the vertical line selection shift register of consecutive vertical lines with as result a reading of consecutive pixels in a horizontal line. The read pixels are provided on an output 3707. Further identified are a clock circuit 3705 which will assist in timing of reading the pixels and inputs 3704. In Muramatsu, at least one input of 3704 is reserved for selecting an addressing mode. Muramatsu and other disclosures on random addressing maintain a horizontal scanning mode. The random character of scanning is usually expressed in random lines or a special sub-array of the sensor array 3700.

FIG. 38 illustrates an aspect of the present invention to scan the sensor elements under a small angle, preferably smaller than 1 degree, but certainly smaller than 5 degrees. Under small angles the distortion in an image may be considered minimal and not or barely noticeable. The structure of the sensor 3800 is similar to 3700. For illustrative purposes three horizontal lines of sensor elements are shown. The read scanlines are provided on an output 3807. The sensor has also horizontal and vertical address decoders and related line selection shift registers. The difference is a control circuit 3805 which may contain a clock circuit, which distributes appropriately the addresses to the horizontal and vertical address decoders. The addresses will be generated in such a way that the sensor elements are read according to a slanted line 3801 and not in a strictly horizontal or vertical line. This slanted reading was already explained above.

One should keep in mind that the angle of scanning is not yet determined and should be programmed by a signal on an input 3802. Such a signal may indicate the angle of scanning. A related signal may be generated that determines the angle of the merge line. For instance based on signals provided on 3802 one may provide to a processor 3803 sufficient data to determine the angle of scanning and the begin point of scanning for each slanted line which determines the scan area 3402 in FIG. 34 in which case one may want to scan from right to left. The coordinates of the scan area and the scan angle may be stored in a memory 3809, which may then provide data to the controller to generate the appropriate scanline element addresses.

Figure 40:
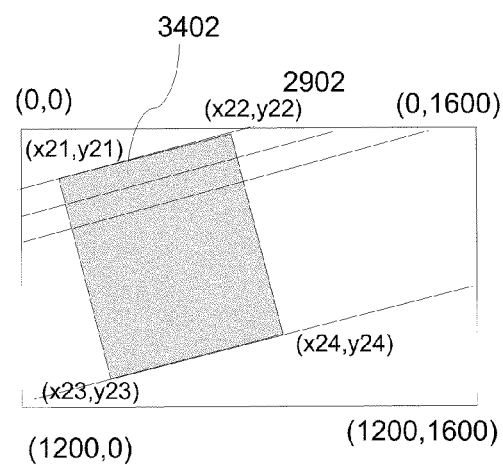

FIG. 40 further illustrates the rotation by providing an angle to the scanlines. The rotated image sensor as shown in FIG. 34 can be scanned with parallel scanlines under a predefined angle which is determined during a calibration step. The scanned lines will create image data in a rectangular axis system.

Figure 41:
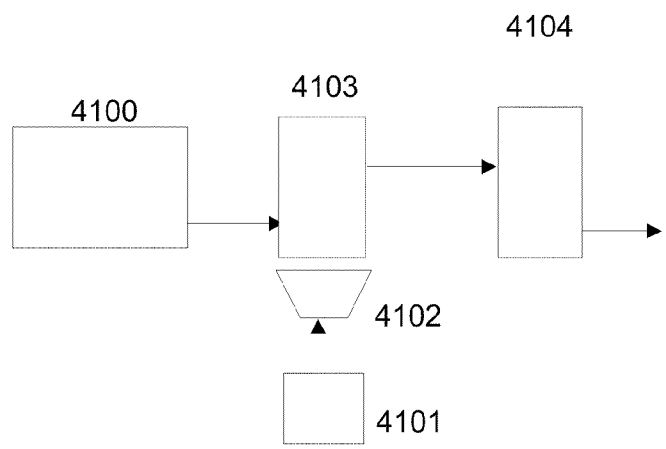
FIG. 41 is a diagram for a transformational addressing system for image data in accordance with an aspect of the present invention.

One may achieve the same as was shown above with a raw image data address transformation which is illustrated in FIG. 41. One may operate a normal rectangular sensor 4100 with horizontal scanlines. During calibration the rotation angle is determined as well as the coordinates of the active sensor area. One may assume that the rotation angle is small, at least smaller than 5 degrees and preferred equal to or smaller than 1 degree. The sensor 4100 is read with horizontal scanlines and the raw sensor data is stored in a buffer 4103. The required transformation to align the rotated image with the reference image is determined during calibration and is stored in processor/memory 4101 which controls address decoder 4102 to buffer 4103. The processor/memory 4101 assures that the buffer is read in such a way that the read data can be stored in a memory 4104 in a rectangular system so that image data read from 4104 and combined with image data from the reference sensor will create a panoramic image. Demosaicing of sensor data takes place preferably after the rotation step.

Combined images may still require some edge smoothing and adjustment for different light conditions. Smoothing may be required for a small strip of connecting pixel areas from at least two different images sensors. The required amount of processing is limited compared to a situation wherein no calibration has happened.

One may also want to consider lens distortion as described above and adjusting the distortion by a computer program on an image processor in the camera. In a further embodiment one may adjust the lens distortion by means of a lens distortion adjustment processing. Adjustment for distortion, not only lens distortion such as barrel and pincushion distortion but also projection distortion such as keystoning may be adjusted with instructions in an image processor.

The calibration for alignment of two sensor images may also be done manually or automatically. For instance one may connect a lens/sensor assembly with at least two lens/sensor units wherein the lens/sensor are put in a fixed position to a large display, while the lenses are trained on a scene having a panoramic field of features such as lines that cross the field-of-view of the individual lenses. One may provide a rotation to the scanlines and horizontal and vertical translation of the rotated image until reference image and rotated image are perfectly aligned. Confirmation of alignment and merge line cause a computer program to determine the transformation required to get images aligned and to calculate the coordinates of the active sensor areas. This is basic geometry and trigonometry and can be easily programmed. In a further embodiment one may also generate instruction for reading raw scanned data in a buffer as illustrated in FIG. 41 into a rectangular addressing system and store the scanned image data in such as manner that reading the stored data in the rectangular address system enables an image that aligns with the reference image.

Figure 42:
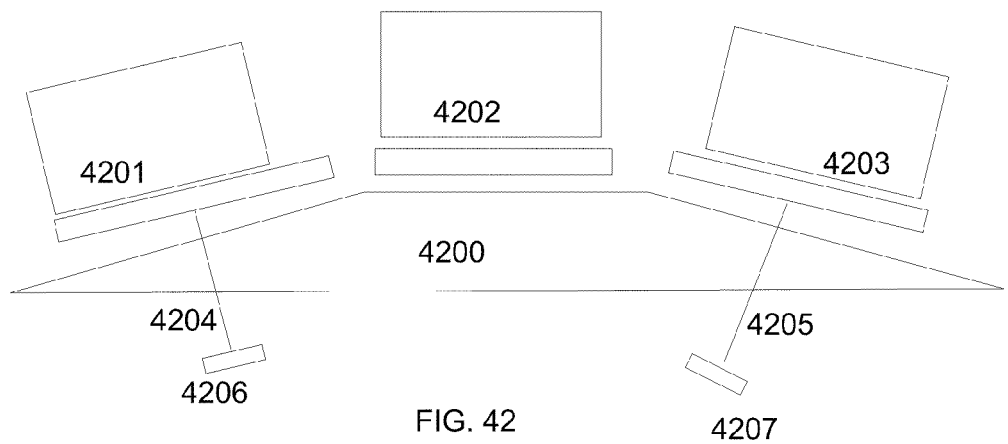
FIG. 42 is a diagram of an embodiment of alignment of lens/sensor units in accordance with an aspect of the present invention.
Figure 43:
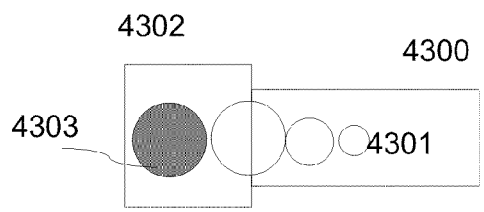
FIG. 43 is a diagram of an micro drive mechanism.

One requirement is that image sensors are not rotated more than 1 to 5 degrees compared to a reference sensor. One may also try to align sensors mechanically. In one embodiment one may have a mechanical adjustment mechanism in the camera connected to at least one sensor unit to be rotated. In a further embodiment one may align the sensor units rotationally within the size of a pixel, which may be about 2 micron. At such a scale a rotation if still present may be treated as a translation. In one embodiment one may create a lens/sensor assembly for instance of 3 lens/sensor units (though 2 or more than 3 is also possible) wherein one uses a prefabricated lens/sensor carrier 4200 as shown in cross section FIG. 42. The carrier already has the correct fixation planes for the lens/sensor units. The lens/sensor units have rotational and translational freedom in the plane of fixation. In a further embodiment lens/sensor units 4201, 4202 and 4203 have to be at least rotationally aligned within preferably within one pixel or at most 5 pixels. Lens/sensor unit 4202 may be considered the reference unit. One may provide the units 4201 and 4203 with shaft 4204 and gear 4206 and shaft 4205 and gear 4207 respectively. The shaft may be fixed to the lens/sensor unit which with the shaft goes through 4200 with at the end a drive gear which may connect to a gear of a high precision drive 4300. One may fixate 4201 and 4203 against the surface of 4200 in such a way that they can rotate about the shafts. One may drive the gear 4206 and 4206 with a rotation mechanism 4300, for instance driven by a stepping motor 4301 with a gearbox with an accuracy of 0.5 micron as shown in diagram as 4300 in FIG. 43. One may provide the Such gearboxes are known and are available for instance from OptoSigma Corporation in Santa Ana, Calif. One may provide the gearbox having a driving stepping motor with a receiving part 4302, which can receive gear 4206 or 4207 in 4303. These devices are known to one of ordinary skill and are not shown herein in detail.

High precision rotation mechanisms such as optical mounts with an accuracy smaller than 1 arcmin are well known, and do not require further explanation. High precision fixation of components with a sub-micron accuracy are also known. For instance relatively high strength bonding systems for micro-electronic, optical and print-nozzle fixation are well known. These bonding systems require high-precision bonding with very low temperature dependency in submicron device position and fixation. Such an ultra precision and reliable bonding method is provided in U.S. Pat. No. 6,284,085 to Gwo issued on Sep. 4, 2001, which is incorporated herein by reference in its entirety.

Based on a scene recorded by the sensors in the lens/sensor assembly displayed on a sufficiently large display one may achieve accurate rotational alignment of the sensors. Once rotational alignment is achieved one may permanently fixate the lens/sensor unit to the carrier 4200. Very accurate fixation techniques using specialized adhesives are known, which allows for accurate fixation with no significant temperature dependent expansion or contraction. Similar techniques for instance are used in precise alignment and fixation of small optical fibers. Further calibration to achieve a panoramic image may include a horizontal/vertical translation and a determination of a merge line by means of processing of image data. One may also achieve translational mechanical alignment with the mechanical tools described herein.

In a further embodiment one may include such a rotational mechanism in an operational camera, so that alignment can take place in the camera by a user or automatically by an alignment program in the camera. In that case a search area may be defined and a registration program may drive the mechanism iteratively until optimal registration is achieved.

Figure 44:
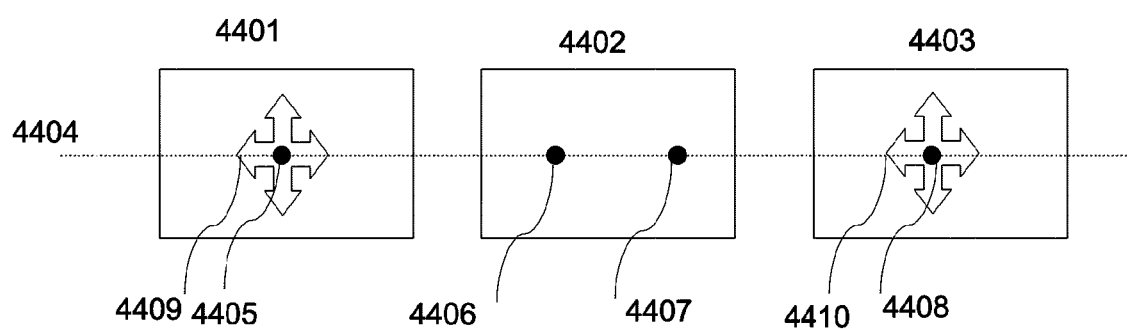
FIG. 44 is a diagram of an alignment system in accordance with an aspect of the present invention.

FIG. 44 illustrates the embodiment of alignment of lens/sensors units. It shown three lens/sensor units 4401, 4402 and 4403, which may be positioned in three different planes. The unit 4402 is in this case the reference unit which may be fixated by at least two fixation points 4406 and 4407. The units 4401 and 4403 have to be at least rotationally aligned and if possible also translationally aligned to 4402. One may position 4401 and 4403 rotationally and translationally at points 4405 and 4408 so that fixation points 4405, 4406, 4407 and 4408 all lie on a plane perpendicular on 4401, 4402 and 4403 indicated by line 4404. Mechanisms 4409 and 4410 may be used to align 4401 and 4403 with 4402 respectively. These mechanisms may be used only during calibration and fixation of the units. They may also be part of the camera and allow the units 4401 and 4403 to remain movable with 4409 and 4410.

One may thus conclude that the herein provided embodiments create two or more aligned lens/sensor units which are substantially rotationally aligned. Substantially rotationally aligned means that it appears that a registered image of one object with image overlap or two objects in two aligned images do not display noticeable rotational distortion by the common user due to rotational misalignment. One may quantify this by for instance by a measure of image misalignment of two images in display (or downsampled) format in one embodiment that is less than one downsampled pixel, but preferably less than half a downsampled pixel in a second embodiment, or less or about than a tenth downsampled pixel in a third embodiment. For instance a camera may have sensors with a horizontal line having at least 1000 pixels while a display in a camera may have 100 display pixels on a horizontal line. In terms of the original sensor format, the rotational misalignment is less than or about 1 degree between horizontal lines of two sensors in one embodiment. In a further embodiment the rotational misalignment is less or about 1 of a degree. In yet a further embodiment the rotational misalignment is less than or about 1 arcmin. Because one may align within or better than at least 1 micron, one may in a further embodiment define rotational misalignment as being about or less than 2 pixels on a merge line. In yet a further embodiment, one may define rotational misalignment as being about or less than 1 pixel. In yet a further embodiment, one may define rotational misalignment as being about or less than 1 micron. At very small angles, the rotational misalignment on the merge line is almost indistinguishable from a translational misalignment.

Aspects of the present invention enable a camera, which may be incorporated in a mobile computing device or a mobile camera, or a mobile phone that allows a user to generate a registered panoramic photograph or video image without registration processing or without substantial registration processing that can be viewed on a display on the camera. If any registration processing needs to be done, it may be limited to an area that is not wider than 2, or 4 or 10 pixels. There is thus no requirement for extensive searching for an overlap of images. In fact, if any further registration processing is required it is already determined in the calibration step if a mismatch does occur and predetermined adjustment may already be programmed. This may include transition line smoothing. Lighting difference in sensors may be detected, which may not be considered registration errors, but still need to be addressed. One may address these differences in a display algorithm that makes sure that the displayed pixels, at least in the overlap area are equalized. One may also address these differences during processing of the raw image data. It is again pointed out that algorithms for smoothing and fine alignment of images are well known and are for instance available in the well known Adobe® Photoshop® application, or in image processing application such as provided by Matlab® of The Mathworks™.

As was shown above one may create lens/sensor assemblies wherein the sensors are rotationally positioned within any desired misalignment angle. If so desired one may rotationally align two sensors with a misalignment error of 0 degrees. Or practically horizontal lines of pixels in a first sensor are parallel with the horizontal lines of pixels in a second sensor. The vertical translation of lines of pixels between two sensors cannot be more than half the height of a pixel plus pitch between pixel lines. One may adjust mechanically for any mismatch, which will be in the order of a micron. However, such a vertical misalignment will generally not be visible on a display. The rotational alignment can thus be in the order of arcmins and even in the order of arcsecs if one so desires. As was shown above, one may tolerate a certain amount of rotational misalignment.

For instance the sine of 10 degrees is 0.1736 and the tangent is 0.1763. That means there is a distortion of about 1.5% over equal number of pixels over a horizontal scanline or an angled scanline of 10 degrees. At 15 degrees the distortion is about 3.5%. That distortion is less than 0.4% at 1 degree, and much less than that at 1 degree. Clearly, the rotary misalignment of 0 degree is preferable as one in that case just scans, stores and reads data in horizontal lines. Small angles will not significantly deteriorate the quality of the image, one only has to make sure that data is stored and read along the correct scanlines to be presented in a correct horizontal scheme. One can see that at horizontal lines of 1000 pixels or more even a small angle will cause a vertical jump of several pixels. That is why one needs to determine the active sensor area and store and read the image data accurately. One may store the coordinates of the active sensor area. It has also been shown that the coordinates of an active sensor area are related with rotational alignment and to an angle of rotational misalignment and one may treat it as negligible.

By accurately defining during a calibration the active sensor areas, and a merge line required processing and adjustments steps have been greatly reduced. Thus a panoramic camera having at least two lens/sensor units with fixed focal distance or with adjustable focal distance has been enabled. Panoramic images can be displayed on a display of the camera. They can be reformatted in a standard format. Panoramic images can also be stored on the camera for later display and/or transmission to another device.

The coordinates of active sensor areas can be used in several ways and in different embodiments. They define a merge line of two images. For instance, one has a first active image sensor area with a straight border line defined by coordinates $(x_{sensor1\_right1}, y_{sensor1\_right1})$ and $(x_{sensor1\_right2}, y_{sensor1\_right2})$ and a second image sensor area with a border line defined by coordinates $(x_{sensor2\_right1}, y_{sensor2\_right1})$ and $(x_{sensor2\_right2}, y_{sensor2\_right2})$. Assume that there is no rotation misalignment or the rotation misalignment is so small that the misalignment angle may be considered to be 0 degrees. The translational off-set between two images is reflected in the coordinates. One may then directly merge the image data at the coordinates to create a feature wise registered image. No searching for registration is required. The size of the registered image is of course determined by the other coordinates of the active sensor area. One may adjust intensity of image data for lighting differences. One may perform this adjustment as part of the demosaicing. One may perform demosaicing after creating horizontal pixel lines by merging pixels lines from the individual images or by demosaicing before merging.

Because the lines through $(x_{sensor1\_right1}, y_{sensor1\_right1})$ and $(x_{sensor1\_right2}, y_{sensor1\_right2})$ and through $(x_{sensor2\_right1}, y_{sensor2\_right1})$ and $(x_{sensor2\_right2}, y_{sensor2\_right2})$ are the same merge line one may determine a required rotation of the second line related to the first line, keeping in mind that the first line may not be perpendicular to a horizontal line. One may thus determine a rotational misalignment angle of the line through $(x_{sensor2\_right1}, y_{sensor2\_right1})$ and $(x_{sensor2\_right2}, y_{sensor2\_right2})$, which may be reflected in determining an angle of a scanline or a transformation of data-addresses to store the image data of the second active sensor area in such a way that the image data of the first active image sensor and the transformed or scanned data of the second active image sensor area can be merged to create a directly registered panoramic image without having to search for a merge line.

As discussed above, one may allow a limited search to fine-tune registration. Accordingly, one may say that image data generated by a first active sensor area and image data generated by a second active sensor area are merged to create directly or substantially directly within a defined range of pixel search a registered panoramic image. This does not exclude additional image processing for instance for edge smoothing or intensity equalization or distortion correction. Certainly, for display of the registered image on the camera display no or almost no further registration is required if the pixel density of the image sensors is greater than the pixel density of the camera display.

One may for instance determine an angle of rotational misalignment between two sensors from the required angle of rotation to align lines 3003 and 3004, which are in real life part of the same line in FIG. 30. One may at least during calibration apply optical or computational correction of image distortion to optimize and fine tune the alignment. Displaying the images on a large high pixel density display may increase the accuracy of alignment up to the pixel level.

A controller thus is provided during a calibration step with data related to the active sensor areas of the sensors involved for generating a registered panoramic image, which may include area corners and coordinates, merge line scanline angle and rotation misalignment angle. This data is stored in a memory, which may also include data that determines the data address transformation required to put angled image data into a rectangular frame. During operation the controller applies the stored data related to active sensor area to use image data from active sensor areas that can be merged with no or limited processing to create a registered panoramic image. One may apply no or minimal image processing to do for instance edge smoothing or adjustment over a small range of pixels. One may say that a registered panoramic image is created from image data generated limited substantially to image data from the active sensor area. One may use some image data outside the active areas to compare intensities for instance. Accordingly, a processor applies data gathered during a calibration step determining an active sensor area of a first sensor and data determining an active sensor area of a second sensor to generate a registered panoramic image. A third or even more sensors may also be applied using the above steps. One may use fixed focal length lenses, requiring only one set of active sensor areas. One may also use variable focal lengths lenses which may require for a series of lens settings a determination of active sensor areas. One may also apply lenses with zoom capacity, which may require yet other sets of active sensor areas to be determined.

Once the active areas of sensors are determined, registration is substantially reading data or transformed data and combining the data, with limited processing. One may thus apply the apparatus and methods provided herein to photographic still images as well as to video data.

In a calibration step the active sensor area and scan area is determined and the scan angle. Data related to the active scan area and the scan angle will address the required rotation that will align images generated by two image sensors. Data that will cause the proper slanted scanlines to be created is stored in a memory and will be used in an operational phase to create the rotationally aligned images. The raw image data from the scanning process can then be provided to a demosaicing process step.

By adjusting the scanning angle, which is a matter of generating a scanning program or pixel addresses then prevents the probably more expensive step of mechanically aligning sensors for rotational alignment. Because the scan angle has to be relatively small one may have to position two lens/sensor units in a rotational deviation that is not larger than preferably 1 degree, followed by a programming of a scanning angle.

One may form the apparatus as provided herein by using imaging units, wherein an imaging unit or module is a housing which contains at least a lens and a sensor. In a further embodiment, the imaging module may have memory or buffer to store image data and an addressing decoder to determine the reading or scanlines of the sensor. The module also has inputs for timing control and outputs for providing the image data to the outside world. A module may also have a focus mechanism, a shutter and/or zoom mechanism.

One may create a highly repeatable manufacturing process, wherein after determining once the angle of rotational misalignment error, which may be zero degrees in one embodiment, all cameras manufactured in a similar manner do not require further determination of the alignment error. The embodiment of any camera manufactured thereafter still depends on the initial determination of the initial misalignment error as determined during a calibration.

While there have been shown, described and pointed out, fundamental novel features of the invention as applied to preferred embodiments thereof, it will be understood that various omissions and substitutions and changes in the form and details of the methods, systems and devices illustrated and in its operation may be made by those skilled in the art without departing from the spirit of the invention. It is the intention, therefore, to be limited only as indicated by the scope of the claims or their equivalents appended hereto.

The following patent application, including the specification, claims and drawings, is hereby incorporated by reference herein, as if it were fully set forth herein: U.S. Non-Provisional patent application Ser. No. 12/435,624 filed on May 5, 2009 and U.S. Non-Provisional patent application Ser. No. 12/436,874 filed on May 7, 2009.

The invention claimed is:

1. A camera, comprising:
a first and a second imaging unit, each imaging unit including a lens and an image sensor;
a portable body;
the image sensors of the first and second imaging unit being rotationally aligned in the portable body with a misalignment angle that is determined during a calibration and that is not greater than a pre-determined value;
a memory to store setting data generated during the calibration that define first coordinates of a first active area of the image sensor of the first imaging unit that is smaller than a total active sensor area of the image sensor of the first imaging unit and second coordinates of a first active area of the image sensor of the second imaging unit that is smaller than a total active sensor area of the image sensor of the second imaging unit, wherein a combination of the first and second coordinates defines a registered panoramic image;
a controller to apply the setting data to process image data from the image sensors of the first and second imaging unit only generated by its first active areas to generate the registered panoramic image; and
a memory to store the registered panoramic image in a raw image data format prior to a demosaicing.

2. The camera as claimed in claim 1, further comprising a display to display the registered panoramic image.

3. The camera as claimed in claim 2, wherein a pixel density of the image sensor in the first imaging unit is greater than the pixel density of the display.

4. The camera as claimed in claim 1, wherein the registered panoramic image is a video image.

5. The camera as claimed in claim 1, wherein the misalignment angle is about or smaller than 0.5 degree.

6. The camera as claimed in claim 1, wherein the misalignment angle is about or smaller than 1 arcmin.

7. The camera as claimed in claim 1, wherein the misalignment angle is applied to determine a scanline angle for the image sensor of the second imaging unit.

8. The camera as claimed in claim 1, wherein the misalignment angle is applied to generate an address transformation to store image data of the first active area of the image sensor of the second imaging unit in a rectangular addressing scheme.

9. The camera as claimed in claim 1, wherein the camera is comprised in a mobile computing device.

10. The camera as claimed in claim 1, wherein the camera is comprised in a mobile phone.

11. The camera as claimed in claim 1, further comprising at least a third imaging unit including a lens and an image sensor.

12. The camera as claimed in claim 1, wherein the lens of the first imaging unit has a fixed focal length.

13. The camera as claimed in claim 1, wherein the lens of the first imaging unit has a variable focal length and the setting data depends on a focal setting.

14. The camera as claimed in claim 1, wherein the lens of the first imaging unit is a zoom lens and the setting data depends on a zoom setting.

15. The camera as claimed in claim 1, further comprising a motor mechanism that reduces the misalignment angle to negligible.

16. A camera, comprising:
a first and a second imaging unit, each imaging unit including a lens and an image sensor; and
a controller to apply data generated during a calibration that determines a first active sensor area of the image sensor of the first imaging unit that is smaller than a total active sensor area of the image sensor of the first imaging unit and a first active sensor area of the image sensor of the second imaging unit that is smaller than a total active sensor area of the image sensor of the second imaging unit to generate a registered panoramic image during operation of the camera by processing image data of the image sensors of the first and second imaging unit only generated by their first active sensor areas, wherein a misalignment angle between the image sensor of the first imaging unit and the image sensor of the second imaging unit is applied to determine a scanline angle for the image sensor of the second imaging unit.

17. The camera of claim 16, wherein the camera is part of a mobile phone.

18. A camera, comprising:
a portable body;
a first imaging unit including a first image sensor and a first lens and a second imaging unit including a second image sensor and a second lens, wherein during a calibration are defined an active sensor area of the first image sensor that is smaller than a total active area of the first image sensor to generate a first set of image data and an active sensor area of the second image sensor that is smaller than a total active area of the second image sensor to generate a second set of image data; and
a memory to store prior to a de-mosaicing the first and second set of image data, wherein the first and second set of image data form a substantially registered panoramic image in a raw data format.

19. The camera of claim 18, wherein image data generated by the first image sensor and image data generated by the second image sensor each generated by applying a horizontal scanline are rotated relative to each other to compensate for a misalignment angle between the first and second image sensor.

20. The camera of claim 1, further comprising a memory to store the substantially registered panoramic image in a raw image data format prior to a demosaicing.

* * * * *